(12) United States Patent
Fukushima

(10) Patent No.: US 9,908,426 B2
(45) Date of Patent: Mar. 6, 2018

(54) VEHICLE AND MOBILE BODY SYSTEM

(71) Applicant: TDK CORPORATION, Tokyo (JP)

(72) Inventor: Noriyuki Fukushima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 345 days.

(21) Appl. No.: 14/427,601

(22) PCT Filed: Sep. 24, 2013

(86) PCT No.: PCT/JP2013/075612
§ 371 (c)(1),
(2) Date: Mar. 11, 2015

(87) PCT Pub. No.: WO2014/050778
PCT Pub. Date: Apr. 3, 2014

(65) Prior Publication Data
US 2015/0246620 A1    Sep. 3, 2015

(30) Foreign Application Priority Data

Sep. 27, 2012 (JP) .................................. 2012-213851

(51) Int. Cl.
*B60L 1/00* (2006.01)
*B60L 3/00* (2006.01)
(Continued)

(52) U.S. Cl.
CPC ......... *B60L 11/1829* (2013.01); *B60L 11/182* (2013.01); *B60L 11/1824* (2013.01);
(Continued)

(58) Field of Classification Search
USPC .................................. 307/10.1; 320/107–109
See application file for complete search history.

(56) References Cited

U.S. PATENT DOCUMENTS 5,617,003 A * 4/1997 Odachi ................. B60L 11/182
320/108
5,821,731 A * 10/1998 Kuki ................... B60L 11/1805
320/108
(Continued)

FOREIGN PATENT DOCUMENTS

JP   S63-87136 A   4/1988
JP   H09-17666 A   1/1997
(Continued)

OTHER PUBLICATIONS

Oct. 29, 2013 International Search Report issued in International Patent Application No. PCT/JP2013/075612.

*Primary Examiner* — Adam Houston
(74) *Attorney, Agent, or Firm* — Oliff PLC

(57) ABSTRACT

A vehicle includes a vehicle information unit that has information about a positional relationship between axles and a power receiving unit, so it is possible to move a power feeding unit to a position at which the power feeding unit faces the power receiving unit, according to the information about the positional relationship between the axles and the power receiving unit. In a system, a power feeding apparatus moves a power feeding unit to a position at which the power feeding unit faces the power receiving unit, according to a result of a comparison between information about a positional relationship between the axles of a vehicle and the power receiving unit in it and information that identifies the vehicle and to parking lot information.

9 Claims, 17 Drawing Sheets

(51) Int. Cl.
*H02G 3/00* (2006.01)
*B60L 11/18* (2006.01)
*H02J 7/00* (2006.01)
*H02J 17/00* (2006.01)
*H02J 7/02* (2016.01)
*H02J 50/10* (2016.01)
*H02J 50/12* (2016.01)
*H02J 50/90* (2016.01)

(52) U.S. Cl.
CPC ......... *B60L 11/1833* (2013.01); *H02J 7/0027* (2013.01); *H02J 7/025* (2013.01); *H02J 17/00* (2013.01); *H02J 50/10* (2016.02); *H02J 50/12* (2016.02); *H02J 50/90* (2016.02); *Y02T 10/7005* (2013.01); *Y02T 10/7055* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 5,850,135 A | 12/1998 | Kuki et al. | |
| 8,917,056 B2* | 12/2014 | Jung | H02J 5/005 180/65.21 |
| 9,379,572 B2* | 6/2016 | Ichikawa | H02J 7/025 |
| 9,539,911 B2* | 1/2017 | Ohashi | B60L 11/1831 |
| 9,561,730 B2* | 2/2017 | Widmer | B60L 11/182 |
| 9,566,871 B2* | 2/2017 | Konno | B60L 3/0069 |
| 9,586,493 B2* | 3/2017 | Patwardhan | B60L 11/1827 |
| 9,586,494 B2* | 3/2017 | Konet | B60L 11/182 |
| 9,623,759 B2* | 4/2017 | Ichikawa | B60L 11/1827 |
| 9,623,767 B2* | 4/2017 | Imazu | B60L 11/182 |
| 9,631,950 B2* | 4/2017 | Raedy | B60L 11/182 |
| 2011/0181240 A1* | 7/2011 | Baarman | B60L 11/182 320/108 |
| 2011/0254504 A1* | 10/2011 | Haddad | B60L 11/1827 320/109 |
| 2014/0292270 A1* | 10/2014 | Ichikawa | B60L 7/14 320/108 |
| 2014/0305722 A1* | 10/2014 | Ichikawa | B60L 11/182 180/65.31 |
| 2014/0322570 A1* | 10/2014 | Nakamura | B60K 1/00 429/72 |
| 2014/0372077 A1* | 12/2014 | Tempi | B60L 5/005 702/182 |
| 2015/0246620 A1* | 9/2015 | Fukushima | B60L 11/182 307/10.1 |
| 2016/0052414 A1* | 2/2016 | Bell | G01M 17/007 320/108 |
| 2016/0052415 A1* | 2/2016 | Bell | B60L 11/1833 320/108 |
| 2016/0243950 A1* | 8/2016 | Amari | B60L 11/182 |
| 2016/0250935 A1* | 9/2016 | Yuasa | B60L 11/182 307/10.1 |
| 2016/0250940 A1* | 9/2016 | Uejima | B60L 11/1833 701/22 |

FOREIGN PATENT DOCUMENTS

| | | |
|---|---|---|
| JP | H09-215211 A | 8/1997 |
| JP | 2007-189769 A | 7/2007 |
| JP | 2011-036107 A | 2/2011 |
| JP | 2011-121405 A | 6/2011 |
| JP | 2011-205829 A | 10/2011 |
| JP | 2011-217452 A | 10/2011 |

* cited by examiner

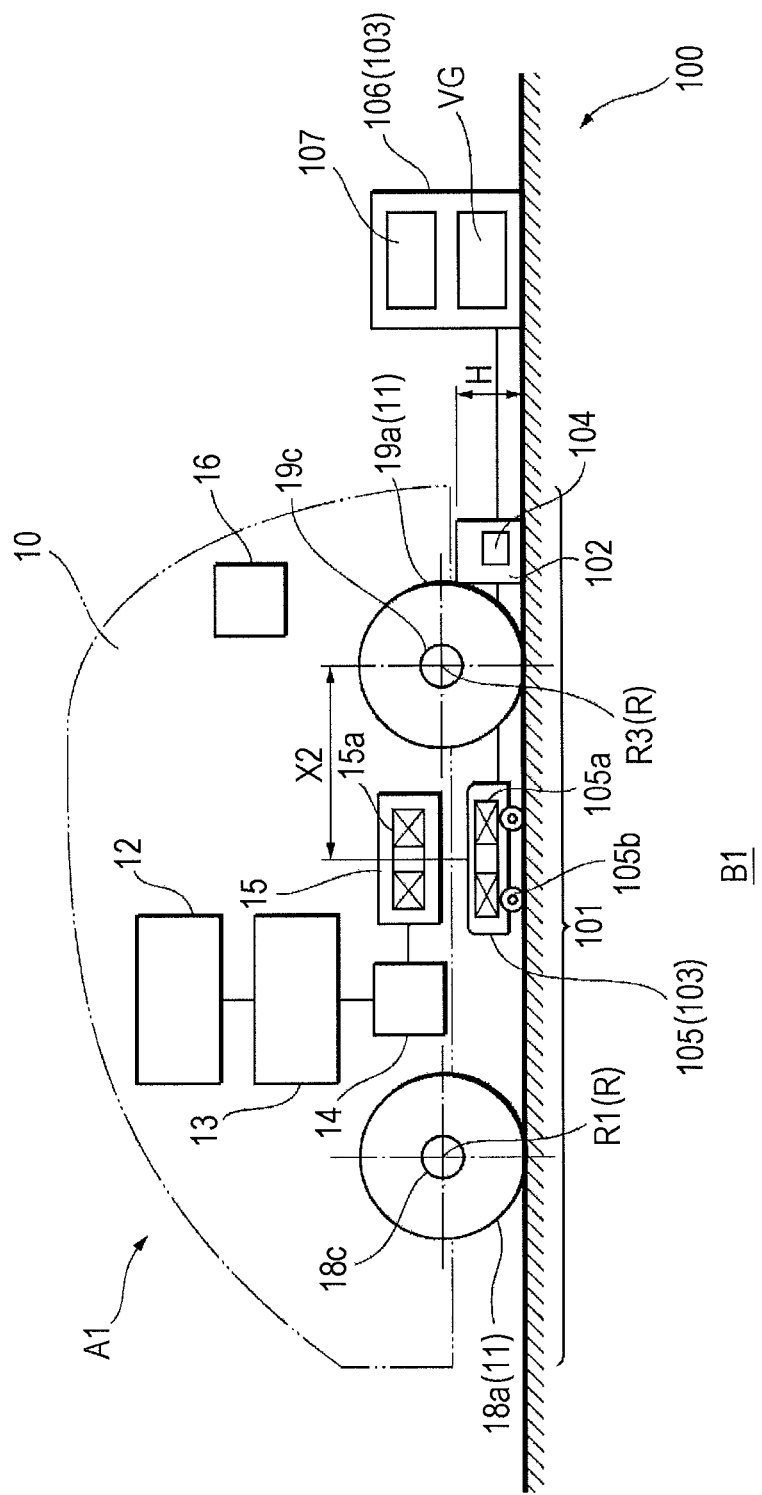

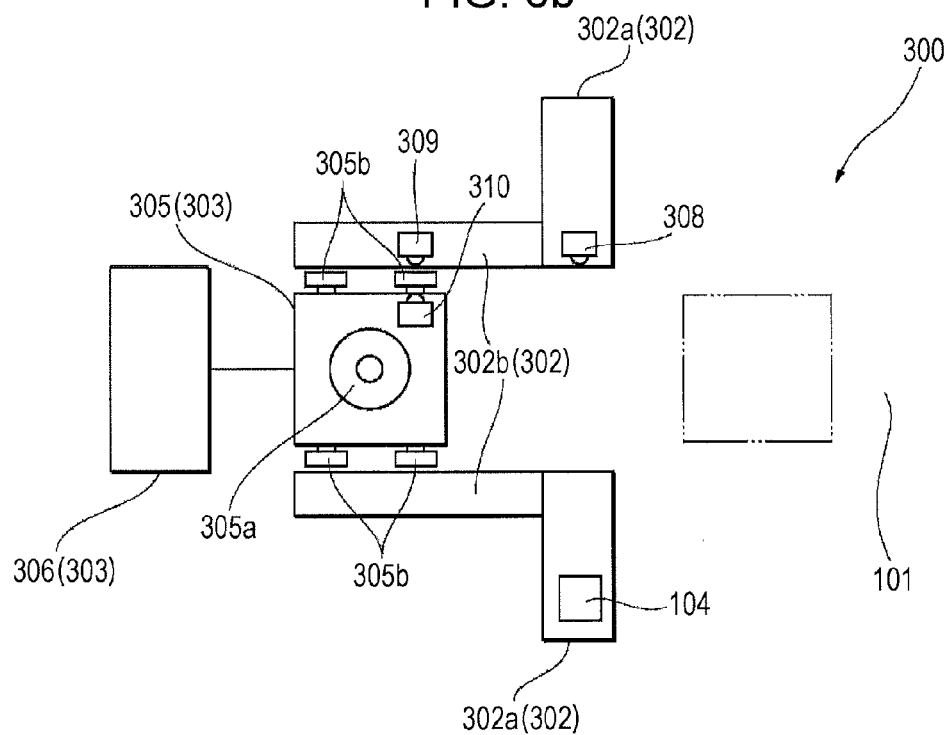
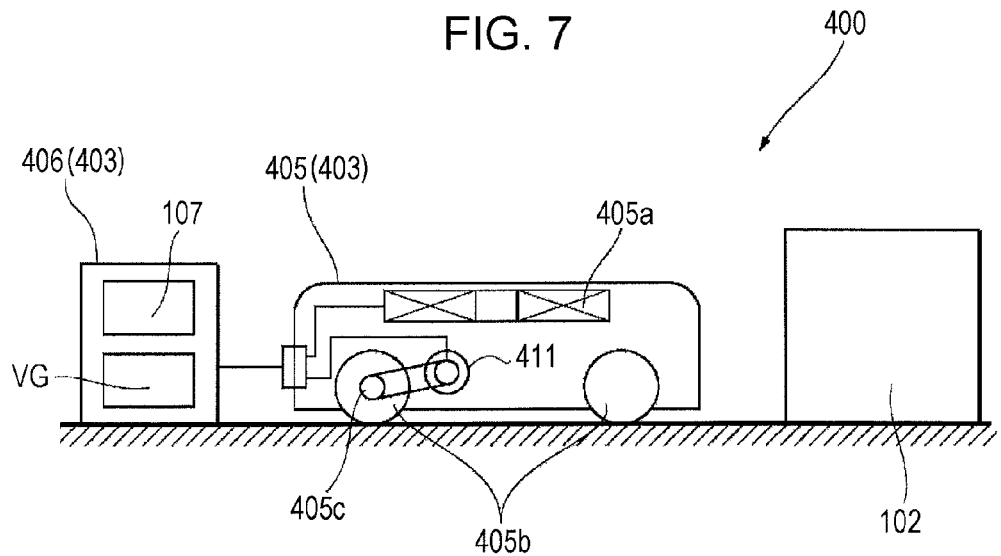

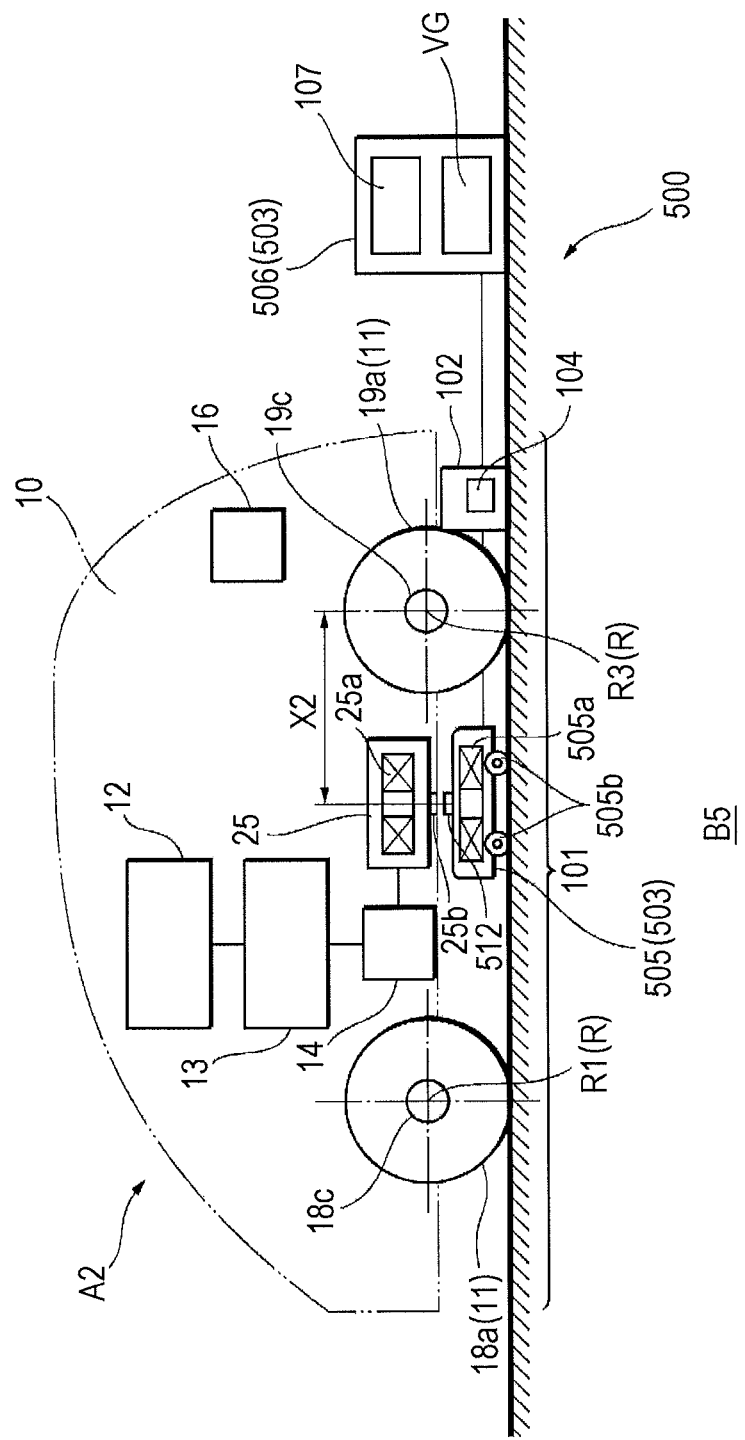

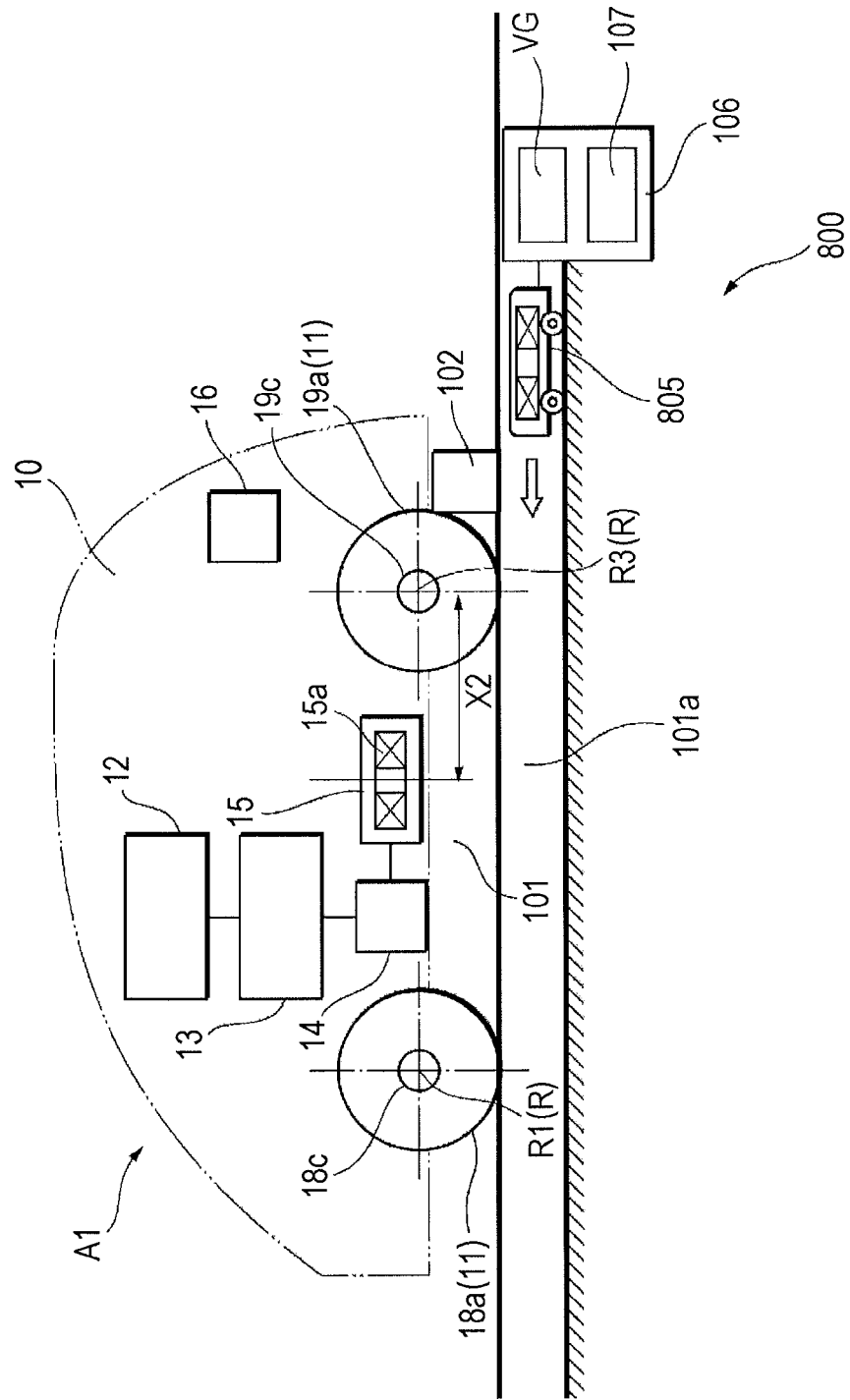

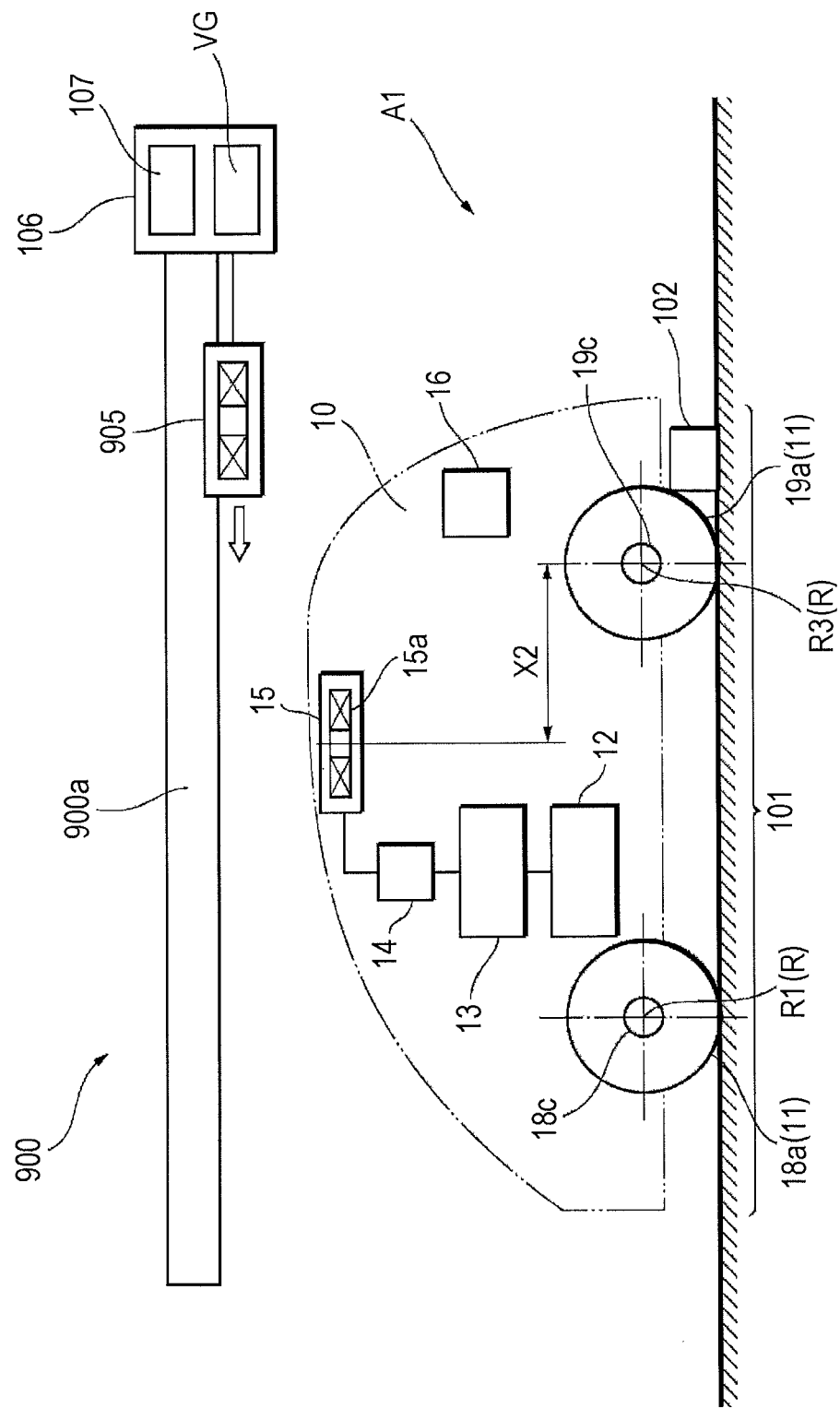

VEHICLE AND MOBILE BODY SYSTEM

TECHNICAL FIELD

The present invention relates to a vehicle and a mobile body system.

BACKGROUND ART

Non-contact power feeding technologies by which electric power is contactlessly supplied without using a power cord are attracting attention. Current wireless power feeding technologies are broadly classified into three types: (A) a type in which electromagnetic induction is used (for a short distance), (B) a type in which radio waves are used (for a long distance), and (C) a type in which resonance phenomenon in a magnetic field is used (for a middle distance).

Type (C), in which resonance phenomenon is used, is a relatively new technology. With this technology, high power transmission efficiency can be achieved even at a middle distance of several meters. Therefore, an idea that a power receiving coil is embedded at the bottom of the vehicle of an electric vehicle and electric power is contactlessly transmitted from a power feeding coil under the ground, for example, is under study.

An electric vehicle, which obtains electric power from a vehicle-mounted battery to travel, needs to be periodically charged, so it has been a practice that electric vehicles are parked at a place where a charger is placed and are charged by mutually connecting the battery and the charger with a connector. When a connector is used for charging, however, it is pointed out that workability concerning the handling of the connector and electric wire is poor. Therefore, there has been an increasing desire for a non-contact power feeding technology by which electric power is contactlessly supplied to a vehicle.

As indicated, for example, in PTL 1, a vehicle charging apparatus is disclosed by which an electromagnetic coil for receiving electric power (power receiving coil) attached to a vehicle and an electromagnetic coil for transmitting electric power (power feeding coil) provided in a car stop face each other with tires of the vehicle brought into contact with the car stop so that they can be electromagnetically coupled.

CITATION LIST

Patent Literature

PTL 1: Japanese Unexamined Patent Application Publication No. 63-87136

SUMMARY OF INVENTION

Technical Problem

The vehicle charging apparatus disclosed in PTL 1 needs the position of the power receiving coil to be determined with respect to the car stop. However, the diameter of the wheel is determined for each vehicle, and the shape of the car stop is determined for each parking facility. Therefore, since the position of the power receiving coil largely changes according to a change in the diameter of the wheel or the shape of the car stop, there has been the problem that the position of the power receiving coil mounted in the vehicle cannot be located. In addition, since the position of the power receiving coil is determined with respect to the car stop, the position of the power receiving coil mounted in the vehicle is limited, lowering degrees of freedom in vehicle design.

In addition, since the position of the power receiving coil mounted in the vehicle cannot be located as described above, alignment between a power feeding unit and a power receiving unit becomes difficult. As a result, there has been another problem that power transmission efficiency is lowered.

The present invention addresses the above situation by providing a vehicle that enables the position of a power receiving unit mounted in the vehicle to be easily located and by providing a system that can easily perform alignment between a power feeding unit and the power receiving unit and has high power transmission efficiency.

Solution to Problem

A vehicle according to the present invention is a vehicle equipped with a power receiving unit that receives electric power from a power feeding unit. The vehicle includes a vehicle information unit that has information about a positional relationship between axles and the power receiving unit. Therefore, the power feeding unit can be moved to a position at which the power feeding unit faces the power receiving unit, according to the information about the positional relationship between the axles and the power receiving unit.

According to this vehicle, since the vehicle has information about a positional relationship between the axles and the power receiving unit, even if the diameter of the wheel or the shape of the car stop changes, the position of the power receiving unit is determined with respect to the axles, so the position of the power receiving unit mounted in the vehicle can be easily located. Therefore, it is also possible to move the power feeding unit to a position at which the power feeding unit faces the power receiving unit.

A system according to the present invention is a mobile body system that includes a power feeding apparatus that has a power feeding unit, a parking facility that has car stops, and the vehicle, described above, that travels within the parking facility; a car stop has an information receiving unit that receives information about a positional relationship between axles and a power receiving unit; the car stop or power feeding apparatus has parking lot information; when the vehicle is parked at a predetermined position in the packing facility, the power feeding apparatus moves the power feeding unit to a position at which the power feeding unit faces the power receiving unit, according to the parking lot information and the information about the positional relationship between the axles and the power receiving unit.

According to this system, the car stop receives information about a positional relationship between axles of the vehicle and the power receiving unit in it, and the power feeding apparatus moves the power feeding unit to a position at which the power feeding unit faces the power receiving unit, according to parking lot information and the information about the positional relationship between the axles and the power receiving unit. That is, the car stop has positional information about the power receiving unit mounted in the vehicle, and the power feeding apparatus can move the power feeding unit to the position at which the power feeding unit faces the power receiving unit according to this information. Therefore, alignment between the power feeding unit and the power receiving unit can be easily performed, so power transmission efficiency can be increased.

A system according to the present invention is a mobile body system that includes a power feeding apparatus that has a power feeding unit, a parking facility that has car stops, and the vehicle, described above, that travels within the parking facility; the power feeding apparatus has an information receiving unit that receives information about a positional relationship between axles and a power receiving unit; a car stop or the power feeding apparatus has parking lot information; when the vehicle is parked at a predetermined position in the packing facility, the power feeding apparatus moves the power feeding unit to a position at which the power feeding unit faces the power receiving unit, according to the parking lot information and the information about the positional relationship between the axles and the power receiving unit.

According to this system, the power feeding unit receives information about a positional relationship between axles of the vehicle and the power receiving unit in it, and the power feeding apparatus moves the power feeding unit to a position at which the power feeding unit faces the power receiving unit, according to parking lot information and the information about the positional relationship between the axles and the power receiving unit. That is, the power feeding unit has positional information about the power receiving unit mounted in the vehicle, and the power feeding apparatus can move the power feeding unit to the position at which the power feeding unit faces the power receiving unit according to this information. Therefore, alignment between the power feeding unit and the power receiving unit can be easily performed, so power transmission efficiency can be increased.

Preferably, the power feeding unit travels from a side opposite to a parking space for the vehicle toward the same side as the parking space for the vehicle. In this case, when the vehicle enters the parking space in the parking facility or while the vehicle is performing a parking operation, the power feeding unit can be protected.

Preferably, the parking facility further includes a standby position sensor and a reference position sensor; the standby position sensor senses the standby position of the power feeding unit on the side opposite to the parking space for the vehicle; the reference position sensor senses the reference position of the power feeding unit on a side relatively closer to the parking space for the vehicle than a sensing point of the standby position of the power feeding unit. In this case, the power feeding unit can be moved to or placed in an appropriate position according to a situation in which the vehicle is not in the parking space in the parking facility, the vehicle enters the parking space in the parking facility, the vehicle is parked in the parking space in the parking facility, or the like.

Preferably, the power feeding unit has a self-running function. In this case, the unit size of the power feeding unit can be reduced. In addition, since the travelling range of the power feeding unit is widened, precision in alignment between the power feeding unit and the power receiving unit can be further improved.

Preferably, the power receiving unit further has a detection mark; the power feeding unit has a detection sensor; the power feeding apparatus stops the power feeding unit at a position at which the detection mark is detected by the detection sensor. In this case, fine adjustment of alignment between the power feeding unit and the power receiving unit is possible, so power transmission efficiency can be further increased.

Preferably, the vehicle further has a direction mark at the front bottom of the vehicle body or the back bottom of the vehicle body; the power feeding unit has a direction detecting sensor; the direction detecting sensor transmits a direction signal, which indicates whether the direction mark has been detected, to the information receiving unit. In this case, since whether the parking orientation of the vehicle is forward or backward can be decided, the orientation in which the vehicle is parked in the parking facility is not restricted. Furthermore, the power feeding unit travels according to information about the parking orientation of the vehicle, alignment between the power feeding unit and the power receiving unit can be reliably performed.

Furthermore, a system according to the present invention is a mobile body system that includes a power feeding apparatus that has a power feeding unit, a parking facility that has car stops, and a vehicle that has a power receiving unit that receives electric power from the power feeding unit, the vehicle travelling within the parking facility; a car stop or the power feeding apparatus has parking lot information; the power feeding apparatus moves the power feeding unit to a position at which the power feeding unit faces the power receiving unit, according to a result of comparison between information about a positional relationship between axles of the vehicle and the power receiving unit and information used to identify the vehicle and to the parking lot information.

According to this system, the power feeding unit is moved to a position at which the power feeding unit faces the power receiving unit, according to a result of comparison between information about a positional relationship between axles of the vehicle and the power receiving unit and information used to identify the vehicle and to the parking lot information. Therefore, alignment between the power feeding unit and the power receiving unit can be easily performed, so power transmission efficiency can be increased.

Advantageous Effects of Invention

According to the vehicle in the present invention, the position of a power receiving coil mounted in the vehicle can be easily located. According to the system in the present invention, alignment between a power feeding unit and a power receiving unit can be easily performed, so power transmission efficiency can be increased.

BRIEF DESCRIPTION OF DRAWINGS

FIG. 3 is a schematic cross sectional view illustrating the structure of a system according to a first embodiment of a second invention.

FIG. 5b is a schematic enlarged cross sectional view of the parking facility in FIG. 5a.

FIG. 6b is a schematic enlarged top view of the parking facility in FIG. 6a.

FIG. 7 is a schematic enlarged cross sectional view illustrating the structure of a parking facility in a system according to a fourth embodiment of the second invention.

FIG. 8b is a schematic enlarged cross sectional view of a power feeding unit in the system according to the fifth embodiment of the second invention.

FIG. 11 is a schematic cross sectional view illustrating an example in which a power feeding unit is placed under the ground.

FIG. 12 is a schematic cross sectional view illustrating an example in which a power feeding unit is placed on the roof of a parking facility.

DESCRIPTION OF EMBODIMENTS

Figure 1:
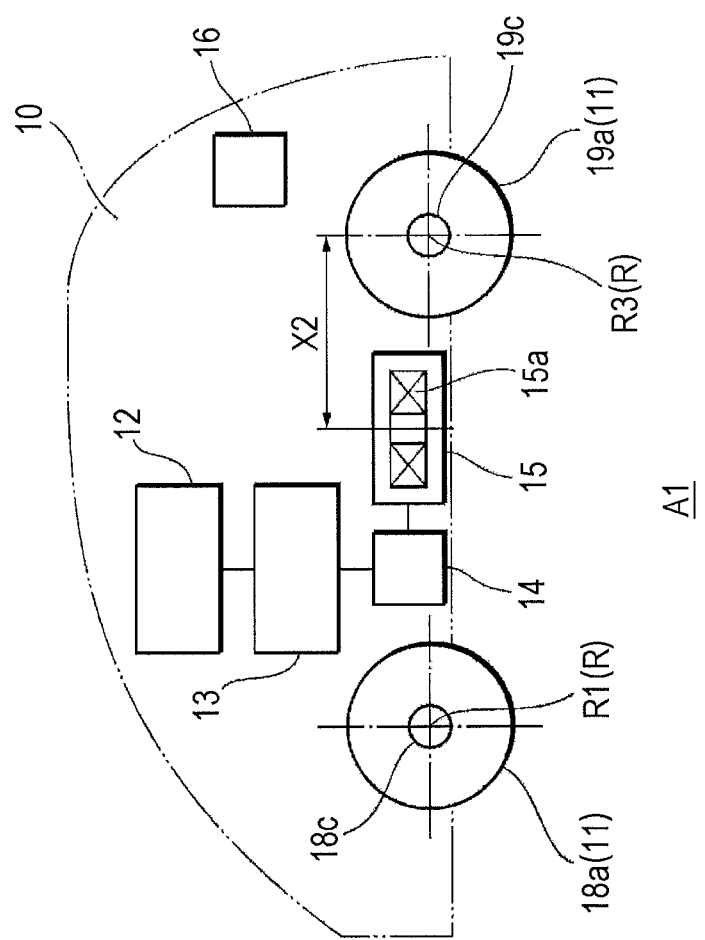
FIG. 1 is a schematic cross sectional view illustrating the structure of a vehicle according to an embodiment of a first invention.

Forms that embody the present invention (embodiments) will be described in detail with reference to the drawing. In descriptions below, like elements or elements having like functions are denoted by like reference characters, and repeated descriptions will be omitted.

Figure 2:
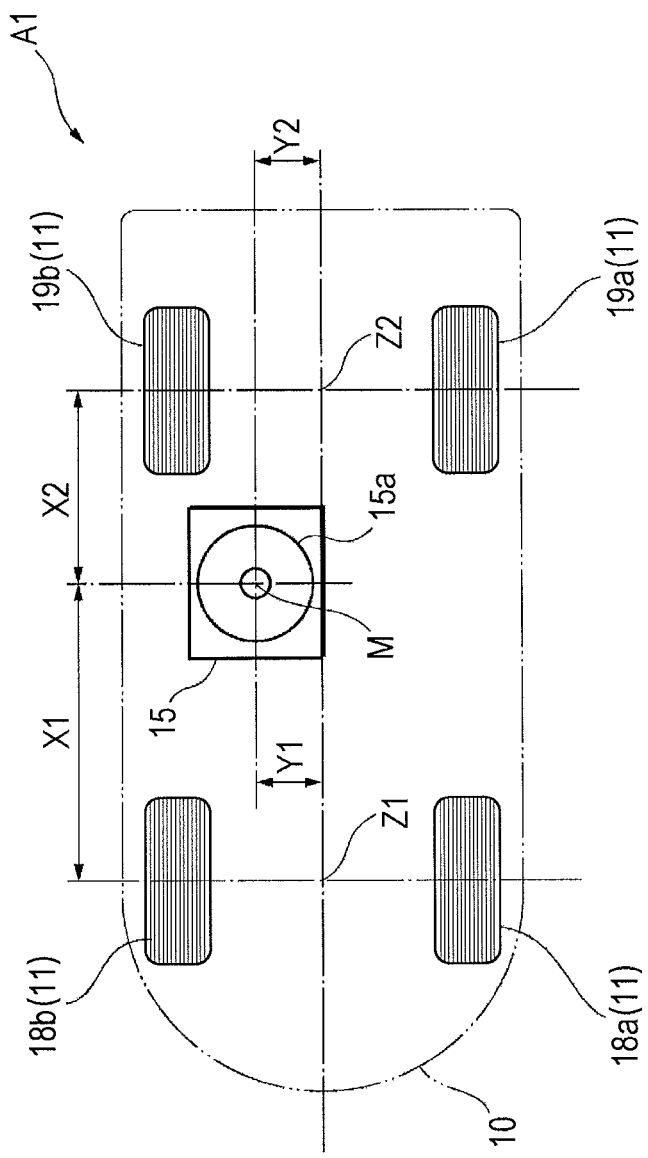
FIG. 2 is a schematic top view illustrating the structure of the vehicle according to the embodiment of the first invention.

First, the structure in an embodiment of a vehicle according to a first embodiment will be described with reference to FIGS. 1 and 2. FIG. 1 is a schematic cross sectional view illustrating the structure of a vehicle A1 according to an embodiment of a first invention. FIG. 2 is a schematic top view illustrating the structure of the vehicle A1 according to the embodiment of the first invention.

As illustrated in FIG. 1, the vehicle A1 includes a vehicle body 10, tires 11, a load 12, a battery 13, a rectifier 14, a power receiving unit 15, and a vehicle information unit 16. Examples of the vehicle A1 include electric vehicles and hybrid vehicles that use electric power of the battery 13 as well as vehicles that convey articles in a plant.

The vehicle body 10 includes a seat space (not illustrated) in which a driver and/or a passenger seats and a space in which the load 12, battery 13, rectifier 14, power receiving unit 15, vehicle information unit 16, and the like are placed.

The tires 11 include front wheels 18a and 18b, which are suspended at the front bottom of the vehicle body 10, on the right and left and also include rear wheels 19a and 19b, which are suspended at the back bottom of the vehicle body 10, on the right and left. The front wheels 18a and 18b on the right and left are rotatably supported by a front wheel axis 18c, which passes substantially through the centers of the wheels. The rear wheels 19a and 19b on the right and left are rotatably supported by a rear wheel axis 19c, which passes substantially through the center of the wheels.

The load 12 includes an electric motor and a driving circuit. The load 12, which is connected to the battery 13, generates a driving force of the vehicle A1 from electric power supplied from the battery 13. Although, in this embodiment, all tires 11 are driven with a single electric motor, the embodiment can also be applied to a so-called in-wheel motor, which is an electric motor incorporated for each tire 11.

The battery 13 is a secondary battery that can be repeatedly charged. Examples of the battery 13 include lithium-ion batteries and nickel hydride batteries. The battery 13 is connected to the power receiving unit 15 through the rectifier 14. Electric power transmitted from a power feeding facility outside the vehicle A1 is supplied to the battery 13.

The rectifier 14 rectifies alternate-current power generated in the power receiving unit 15 and outputs direct current power. Examples of the rectifier 14 include transistors, diodes, and other semiconductor elements.

The power receiving unit 15 is placed at the bottom of the vehicle body 10. The power receiving unit 15 is structured by including a power receiving coil 15a. The power receiving unit 15 has a function that uses the power receiving coil 15a to receive electric power transmitted from a power feeding facility, which will be described later. The power receiving unit 15 is packaged in a case with an insulation property. Although, in this embodiment, the power receiving unit 15 is disposed at the bottom of the vehicle body 10, there is no particular limitation to the position of the power receiving unit 15 if the power receiving unit 15 is placed outside the seat space of the vehicle A1; the power receiving unit 15 may be placed in the upper portion, front portion or rear portion of the vehicle body 10 or on its side surface. The power receiving unit 15 may be structured with a single power receiving coil 15a or a plurality of power receiving coils 15a.

The vehicle information unit 16 has information about a positional relationship between the axles R of the vehicle A1 and the power receiving unit 15 in it. Although, in this embodiment, the vehicle information unit 16 is placed in the rear portion of the vehicle body 10, the vehicle information unit 16 may be placed in the front portion of the vehicle body 10. Alternatively, the vehicle information unit 16 may be placed at two places, the front portion of the vehicle body 10 and the rear portion of the vehicle body 10. There is no particular limitation to the vehicle information unit 16 if the vehicle information unit 16 can record information. Examples of the vehicle information unit 16 include RF-ID (radio frequency identification) tags, bar codes, and hard disks. The vehicle information unit 16 also has a function of transmitting information included in the vehicle information unit 16 to the outside.

Now, the information about the positional relationship between the axles R of the vehicle A1 and the power receiving unit 15 in it will be described in detail. The axle R refers to the center of a rotational axes of the wheel; the front wheels 18a and 18b have axles R1 and R2, respectively, and the rear wheel 19a and 19b have wheel R3 and R4, respectively. As illustrated in FIG. 2, a distance from the center Z1 of a straight line that connects the axle R1 of the front wheel 18a and the axle R2 of the front wheel 18b to the center M of the power receiving unit 15 will be denoted X1, the distance being parallel to the travelling direction of the vehicle A1, and a distance orthogonal to the travelling direction of the vehicle A1 will be denoted Y1. Similarly, a distance from the center Z2 of a straight line that connects the axle R3 of the rear wheel 19a and the axle R4 of the rear wheel 19b to the center M of the power receiving unit 15 will be denoted X2, the distance being parallel to the travelling direction of the vehicle A1, and a distance orthogonal to the travelling direction of the vehicle A1 will be denoted Y2. The vehicle information unit 16 has information about X1, X2, Y1 and Y2 as the information about the positional relationship between the axles R of the vehicle A1 and the power receiving unit 15 in it. Although, in this embodiment, the vehicle information unit 16 accumulates information about X1, X2, Y1 and Y2, the vehicle information unit 16 may accumulate information about only X1 and Y1. If the center M of the power receiving unit 15 is in the vicinity of an x axis, which will be described later, the vehicle information unit 16 may accumulate information about only X1.

The information about the positional relationship between the axles R of the vehicle A1 and the power receiving unit 15 in it will be descried in further detail. A straight line that connects the axle R1 of the front wheel 18a and the axle R2 of the front wheel 18b will be referred to as a y axis, and a bisector perpendicular to the straight line will be referred to as an x axis. Then, Z1 illustrated in FIG. 2 is the origin of an xy plane formed with the y axis and x axis. In this case, the center M of the power receiving unit 15 is at a position away from Z1 by X1 in the x-axis direction and at a position away from Z1 by Y1 in the y-axis direction. A straight line that connects the axle R3 of the rear wheel 19a and the axle R4 of the rear wheel 19b will be referred to as the y axis, and a bisector perpendicular to the straight line will be referred to as the x axis. Then, Z2 illustrated in FIG. 2 is the origin of the xy plane formed with the y axis and x axis. In this case, the center M of the power receiving unit 15 is at a position away from Z2 by X2 in the x-axis direction and at a position away from Z2 by Y2 in the y-axis direction. That is, the positional relationship between the axles R and the power receiving unit 15 refers to position information about the power receiving unit 15 in a coordinate system based on the axles. That is, by using the information about the positional relationship between the axles R and the power receiving unit 15, it is possible to move a power feeding unit to a position at which the power feeding unit faces the power receiving unit 15.

As described above, as for the vehicle A1 according to this embodiment, the vehicle information unit 16 has information about the positional relationship between the axles R and the power receiving unit 15, that is, information about X1, X2, Y1, and Y2. Therefore, even if the diameter of the wheel or the shape of the car stop changes, the position of the power receiving unit 15 is determined with respect to the axles R, so the position of the power receiving unit 15 mounted in the vehicle A1 can be easily located. Accordingly, since it is also possible to move the power feeding unit to a position at which the power feeding unit faces the power receiving unit, when a non-contact power feeding technology by which electric power is transferred from a power feeding apparatus to the vehicle A1 according to this embodiment is applied, power transmission efficiency can be increased.

First Embodiment

Next, a structure in a first embodiment of a system according to a second invention will be described with reference to FIG. 3. FIG. 3 is a schematic cross sectional view illustrating the structure of a system B1 according to the first embodiment of the second invention.

The system B1 includes the vehicle A1 and a parking facility 100. The structure of the vehicle A1 is the same as in the embodiment of the first invention, so the description of the vehicle A1 will be omitted.

The parking facility 100 includes a parking space 101, car stops 102, and a power feeding apparatus 103. In this embodiment, the vehicle A1 is parked in the parking space 101.

The parking space 101 is an area that defines a range in which the vehicle A1 can be parked. When the vehicle A1 is to be parked, the vehicle A1 travels horizontally from other than the area of the parking space 101 and enters the area of the parking space 101.

The car stops 102 are disposed so as to extend in the parking space 101 in a direction crossing the travelling direction of the vehicle A1. In other words, the car stops 102 are disposed so as to extend in the width direction of the vehicle A1. The car stops 102 have a function of restricting the positions of the wheels of the vehicle A1. Although, in this embodiment, the shape of the cross sectional of the car stop 102 is substantially rectangular, the shape may be substantially trapezoidal, substantially semicircular, or substantially elliptical. In addition, although, in this embodiment, the car stop 102 has a convex shape protruding from the ground surface in the parking space 101, the car stop 102 may have a concave shape such as a groove into which the tire 11 of the vehicle A1 fits. The car stops 102 may be a single car stop 102 into which the car stop 102 that restricts the position of the left tire 11 of the vehicle A1 and the car stop 102 that restricts the position of the right tire 11 are integrated. Alternatively, the car stops 102 may be provided individually.

Furthermore, a car stop 102 includes an information receiving unit 104 that receives information about a positional relationship between the axles R and the power receiving unit 15, the information being in the vehicle information unit 16. The car stop 102 also has parking lot information. The parking lot information includes information about a positional relationship between the car stops 102 and the axles R, the information being derived by using the height H of the car stop 102, the shape of the car stop 102, and other car stop information, and also includes information about a positional relationship between the car stops 102 and a power feeding unit 105, which will be described later. The car stop 102 has a function of transmitting the information about the positional relationship between the axles R and the power receiving unit 15, the information having been received by the information receiving unit 104, and the parking lot information to a control unit 107 in the power feeding apparatus 103, which will be described later. Although, in this embodiment, the car stop 102 has the parking lot information, the power feeding apparatus 103, which will be described later, may have the parking lot information.

The power feeding apparatus 103 includes the power feeding unit 105, which is placed in an above-ground space in the parking facility 100, and a power feeding control unit 106.

The power feeding unit 105 is structured by including a power feeding coil 105a. The power feeding coil 105a is used to transmit electric power supplied from the power feeding control unit 106 to the power receiving unit 15. The power feeding unit 105 is packaged in a case with an insulation property. The power feeding unit 105 may be formed with a single power feeding coil 105a or a plurality of power feeding coils 105a. The height of the power feeding unit 105 is preferably set so as to be lower than the height H of the car stop 102. In this case, contact between the power feeding unit 105 and the vehicle A1 can be prevented, and degrees of freedom in design of the vehicle A1 can be increased.

The power feeding unit 105 has functions of travelling within the parking facility 100. As a travelling means, four running wheels 105b are provided at the bottom of the power feeding unit 105. The power feeding unit 105 has a function of travelling in a direction parallel to the travelling direction of the vehicle A1, that is, from a side opposite to the parking space 101 toward the same side as the parking space 101. The power feeding unit 105 also has a function of travelling in a direction orthogonal to the travelling direction of the vehicle A1.

The power feeding control unit 106 includes a power feeding source VG and a control unit 107. The power feeding source VG supplies alternate-current power to the power feeding unit 105. The control unit 107 moves the power feeding unit 105 so that it faces the power receiving unit 15, according to the parking lot information received from the car stop 102 and the information that the information receiving unit 104 has received (X1, Y1 and/or X2, Y2). Specifically, when the vehicle A1 is parked in the parking space with the front wheels 18a and 18b on the right and left brought into contact with or close to the car stops 102, that is, in the forward orientation, the control unit 107 moves the power feeding unit 105 by the distance X1 in the direction parallel to the travelling direction of the vehicle A1 and by the distance Y1 in the direction orthogonal to the travelling direction of the vehicle A1 from the positions of the axles R with respect to the car stops 102, according to the positional relationship between the car stops 102 and the power feeding unit 105. Alternatively, when the vehicle A1 is parked in the parking space with the rear wheels 19a and 19b on the right and left brought into contact with or close to the car stops 102, that is, in the backward orientation, the control unit 107 moves the power feeding unit 105 by the distance X2 in the direction parallel to the travelling direction of the vehicle A1 and by the distance Y2 in the direction orthogonal to the travelling direction of the vehicle A1 from the positions of the axles R with respect to the car stops 102, according to the positional relationship between the car stops 102 and the power feeding unit 105. Thus, the power feeding unit 105 travels to a position at which the power feeding unit 105 faces the power receiving unit 15.

As described above, in the system B1 according to this embodiment, the car stop 102 receives information about a positional relationship between the axles R of the vehicle A1 and the power receiving unit 15 in it, and the power feeding apparatus 103 moves the power feeding unit 105 to a position at which the power feeding unit 105 faces the power receiving unit 15 according to parking lot information and the information about the positional relationship between the axles R and the power receiving unit 15. That is, the car stop 102 has parking lot information and position information about the power receiving unit 15 mounted in the vehicle A1, so the power feeding apparatus 103 can move the power feeding unit 105 to the position at which the power feeding unit 105 faces the power receiving unit 15. Therefore, alignment between the power feeding unit 105 and the power receiving unit 15 can be easily performed, so power transmission efficiency can be increased.

In the system B1 according to this embodiment, the power feeding unit 105 has a function of travelling from a side opposite to the parking space 101 for the vehicle A1 toward the same side as the parking space 101 for the vehicle A1. Therefore, when the vehicle A1 enters the parking space 101 in the parking facility or while the vehicle A1 is performing a parking operation, the power feeding unit 105 can be protected.

Figure 4A:
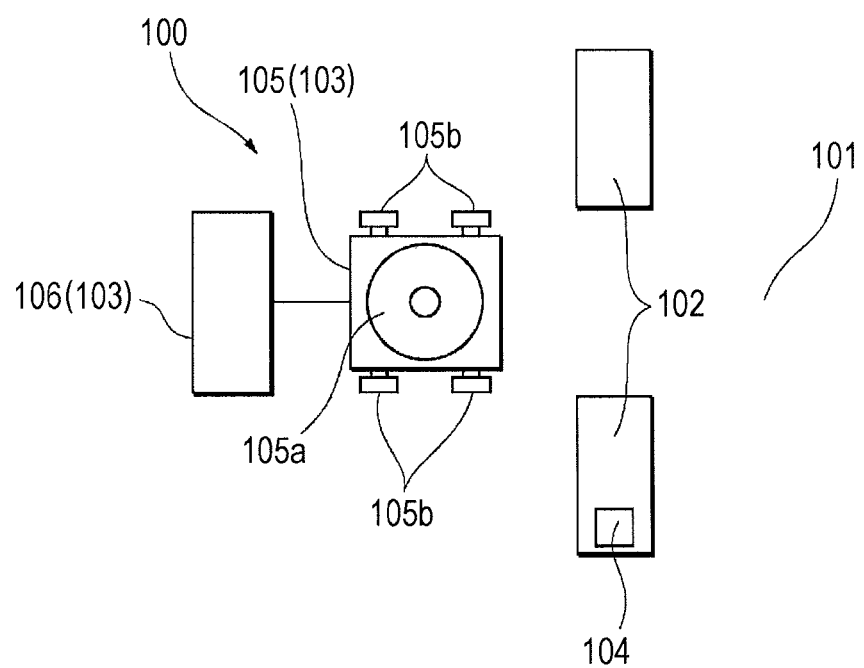
FIG. 4a is a schematic top view of the system, illustrating a state in which a vehicle is not parked in a parking space.
Figure 4B:
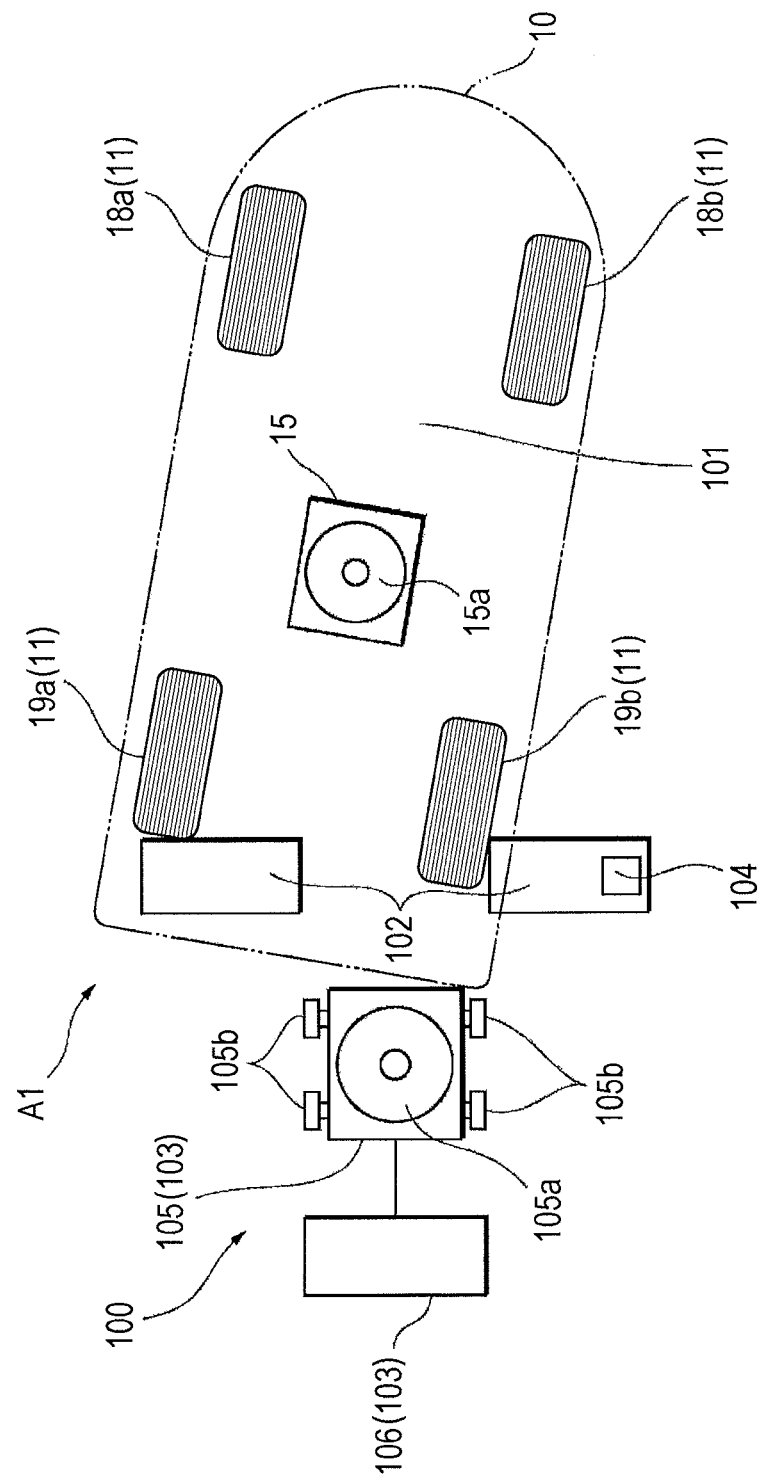
FIG. 4b is a schematic top view of the system, illustrating a state in which a vehicle is entering the parking space.
Figure 4C:
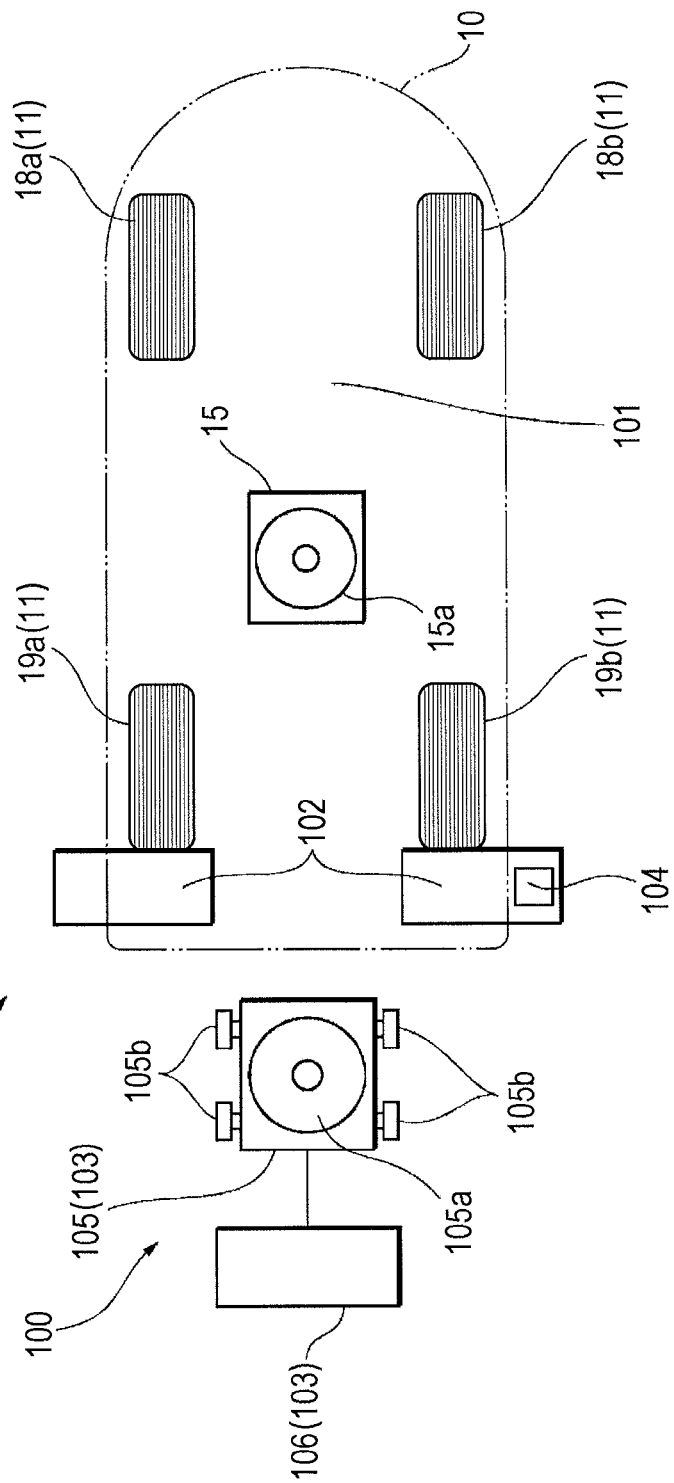
FIG. 4c is a schematic top view of the system, illustrating a state in which the vehicle has been parked in the parking space.
Figure 4D:
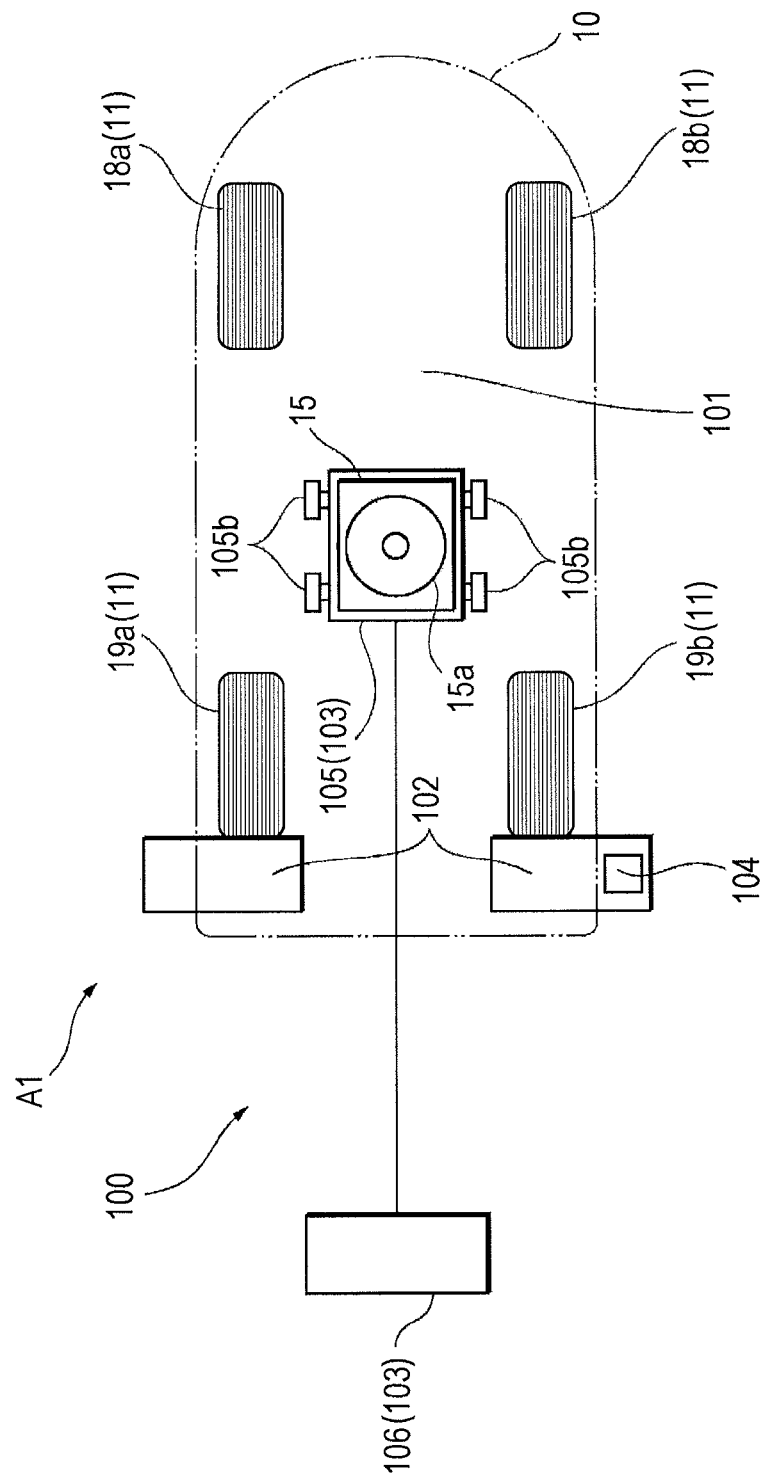
FIG. 4d is a schematic top view of the system, illustrating a state in which a power feeding operation is being performed for the vehicle, which has been parked in the parking space.

Next, a specific power feeding operation will be described in detail with respect to FIG. 4. FIG. 4a is a schematic top view of the system B1, illustrating a state in which the vehicle A1 is not parked in the parking space 101. FIG. 4b is a schematic top view of the system B1, illustrating a state in which the vehicle A1 is entering the parking space 101. FIG. 4c is a schematic top view of the system B1, illustrating a state in which the vehicle A1 has been parked in the parking space 101. FIG. 4d is a schematic top view of the system B1, illustrating a state in which a power feeding operation is being performed for the vehicle A1, which has been parked in the parking space 101.

First, while the vehicle A1 is not parked in the parking space 101, the power feeding unit 105 is positioned on a side opposite to the parking space 101, that is, at a standby position, as illustrated in FIG. 4a.

Next, when the vehicle A1 enters the parking space 101 so that the vehicle A1 is parked, the vehicle A1 travels horizontally within the parking space 101, as illustrated in FIG. 4b. At that time, the power feeding unit 105 is controlled to remain positioned at the standby position. In this case, the steering wheel of the vehicle A1 may be turned several times within the parking space 101 so that vehicle A1 is parked with the front wheels 18a and 18b on the right and left or the rear wheels 19a and 19b on the right and left brought into contact with or close to the car stops 102 in the parking space 101. Even in this case, since the power feeding unit 105 is positioned at the standby position, it is possible to suppress the power feeding unit 105 from being damaged by the vehicle A1.

When the vehicle A1 has completed the parking operation and has been parked in the parking space 101, the power feeding unit 105 starts to travel from the standby position, as illustrated in FIG. 4c. At this time, the power feeding control unit 106 moves the power feeding unit 105 to a position at which the power feeding unit 105 faces the power receiving unit 15 in the vehicle A1 according to parking lot information and information that the information receiving unit 104 has received. Any method can be used to start a power feeding operation. For example, the driver or a passenger may directly command the power feeding apparatus 103 to start the power feeding operation. Alternatively, a tire detection sensor (not illustrated) may be attached to a car stop 102. When the tire detection sensor detects that the tires 11 have been brought into contact with or close to the car stops 102 and the state in which the tires 11 are brought into contact with or close to the car stops 102 continues for a predetermined time, the tire detection sensor may transmit, to the power feeding apparatus 103, a signal that commands the power feeding apparatus 103 to start the power feeding operation. Alternatively, a vehicle detection sensor (not illustrated) that detects whether the vehicle A1 is parked may be provided in the parking space 101. When the vehicle detection sensor recognizes that the vehicle A1 is parked in the parking space 101, the vehicle detection sensor may transmit, to the power feeding apparatus 103, a signal that commands the power feeding apparatus 103 to start the power feeding operation. When the tire detection sensor is used, approach information indicating that the tires 11 have been brought into contact with or close to the car stops 102 may be used to derive the information about the positional relationship between the car stops 102 and the axles R.

When the power feeding unit 105 has travelled to the position at which the power feeding unit 105 faces the power receiving unit 15, the power feeding unit 105 starts to transmit electric power, which has been supplied from the power feeding control unit 106, to the power receiving unit 15 in the vehicle A1, as illustrated in FIG. 4d, after which the electric power received by the power receiving unit 15 in the vehicle A1 is supplied to the battery 13, starting the charging of the battery 13.

Second Embodiment

Figure 5A:
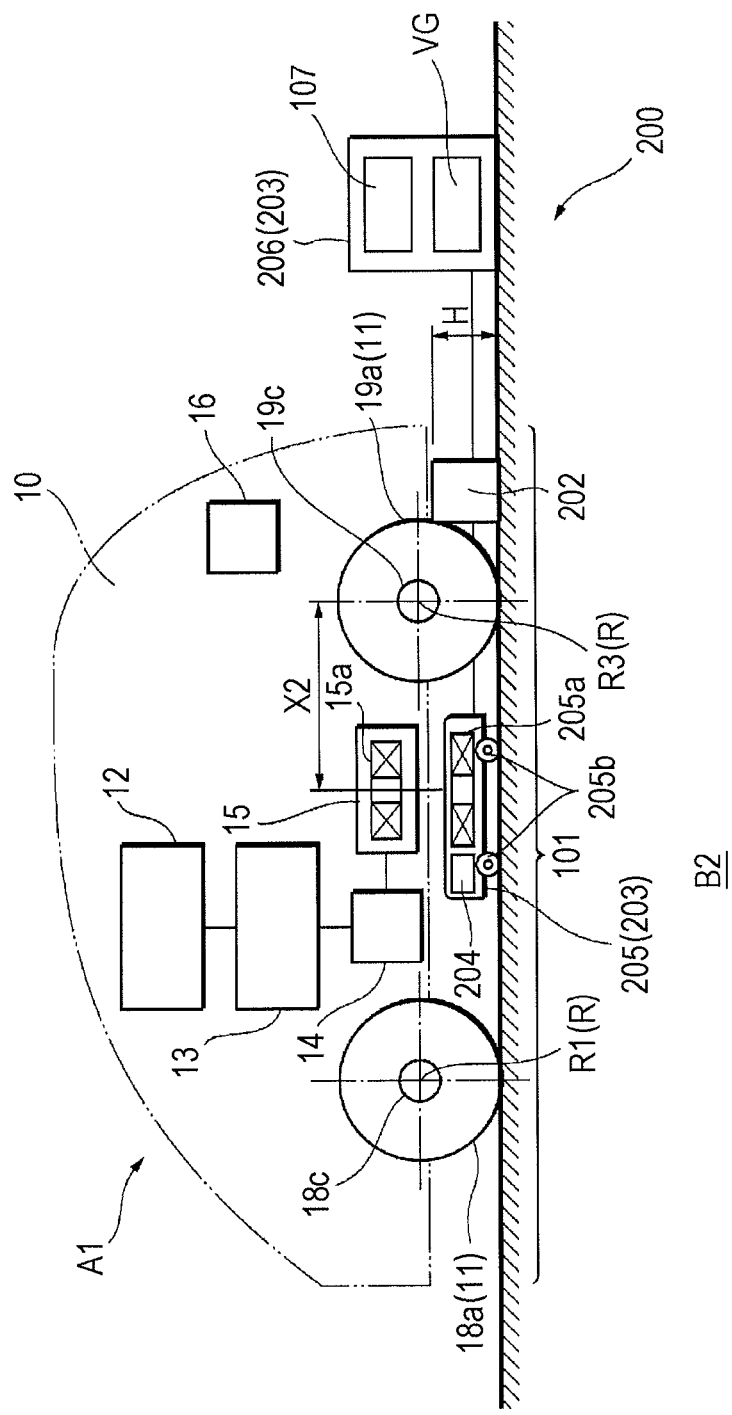
FIG. 5a is a schematic cross sectional view illustrating the structure of a system according to a second embodiment of the second invention.
Figure 5B:
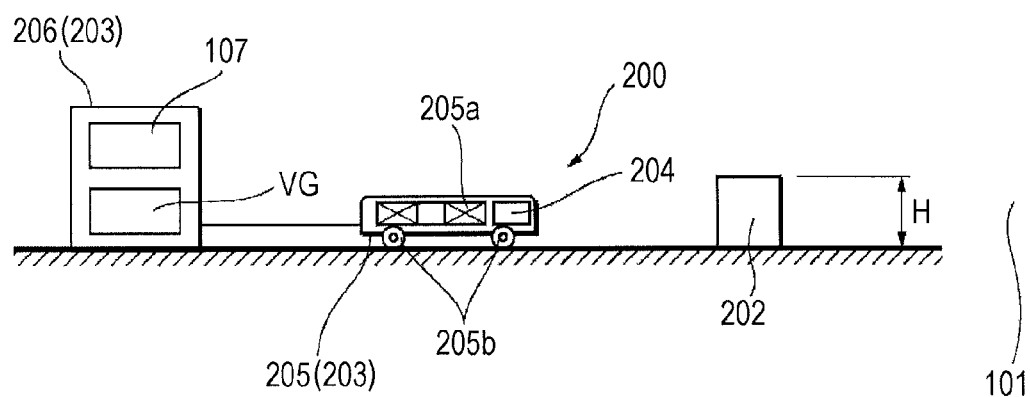

Next, a structure in a second embodiment of a system according to the second invention will be described with reference to FIG. 5. FIG. 5a is a schematic cross sectional view illustrating the structure of a system B2 according to the second embodiment of the second invention. FIG. 5b is a schematic enlarged cross sectional view of the parking facility 200 in FIG. 5a. The system B2 according to the second embodiment of the second invention differs from the system B1 according to the first embodiment of the second invention in the structure of the parking facility. Differences from the first embodiment of the second invention will be mainly described below.

The system B2 includes the vehicle A1 and parking facility 200. The structure of the vehicle A1 is the same as in the embodiment of the first invention, so the description of the vehicle A1 will be omitted.

The parking facility 200 includes the parking space 101, car stops 202, and a power feeding apparatus 203, as in the parking facility 100 in the first embodiment of the second invention.

The power feeding apparatus 203 is structured by including a power feeding unit 205, which is placed in an above-ground space in the parking facility 200, and a power feeding control unit 206, as illustrated in FIG. 5b. The power feeding unit 205 includes a power feeding coil 205a and has functions of travelling within the parking facility 200. As a travelling means, four running wheels 205b are provided at the bottom of the power feeding unit 205. The power feeding unit 205 has a function of travelling in a direction parallel to the travelling direction of the vehicle A1, that is, from a side opposite to the parking space 101 toward the same side as the parking space 101. The power feeding unit 205 also has a function of travelling in a direction orthogonal to the travelling direction of the vehicle A1. However, this embodiment differs from the first embodiment of the second invention in that the power feeding unit 205 includes an information receiving unit 204 and the power feeding unit 205 has parking lot information.

The information receiving unit 204 has a function of receiving information in the vehicle information unit 16. That is, the information receiving unit 204 can receive, from the vehicle information unit 16, information in which a distance from the center Z1 of a straight line that connects the axle R1 of the front wheel 18a and the axle R2 of the front wheel 18b to the center M of the power receiving unit 15 is X1, the distance being parallel to the travelling direction of the vehicle A1, and a distance orthogonal to the travelling direction of the vehicle A1 is Y1 and information in which a distance from the center Z2 of a straight line that connects the axle R3 of the rear wheel 19a and the axle R4 of the rear wheel 19b to the center M of the power receiving unit 15 is X2, the distance being parallel to the travelling direction of the vehicle A1, and a distance orthogonal to the travelling direction of the vehicle A1 is Y2. Although, in this embodiment, the power feeding unit 205 includes the information receiving unit 204, the power feeding control unit 206 may include the information receiving unit 204.

The parking lot information included in the power feeding unit 205 includes information about a positional relationship between the car stops 202 and the axles R, which is derived from the height H of the car stop 202, the shape of the car stop 202, and other information about the car stop 202 and also includes information about a positional relationship between the car stops 202 and the power feeding unit 205, as in the first embodiment of the second invention. Although, in this embodiment, the power feeding unit 205 has the parking lot information, the car stop 202 may have the parking lot information. In this case, the parking lot information is transmitted from the car stop 202 to the power feeding apparatus 203.

As described above, in the system B2 according to this embodiment, the power feeding unit 205 receives information about a positional relationship between the axles R of the vehicle A1 and the power receiving unit 15 in it, and the power feeding apparatus 203 moves the power feeding unit 205 to a position at which the power feeding unit 205 faces the power receiving unit 15 according to parking lot information and the information about the positional relationship between the axles R and the power receiving unit 15. That is, the power feeding unit 205 has position information about the power receiving unit 15 mounted in the vehicle A1, so the power feeding apparatus 203 can move the power feeding unit 205 to the position at which the power feeding unit 205 faces the power receiving unit 15. Therefore, alignment between the power feeding unit 205 and the power receiving unit 15 can be easily performed, so power transmission efficiency can be increased.

In the system B2 according to this embodiment, the power feeding unit 205 has a function of travelling from a side opposite to the parking space 101 for the vehicle A1 toward the same side as the parking space 101 for the vehicle A1. Therefore, when the vehicle A1 enters the parking space 101 in the parking facility or while the vehicle A1 is performing a parking operation, the power feeding unit 205 can be protected.

Third Embodiment

Figure 6A:
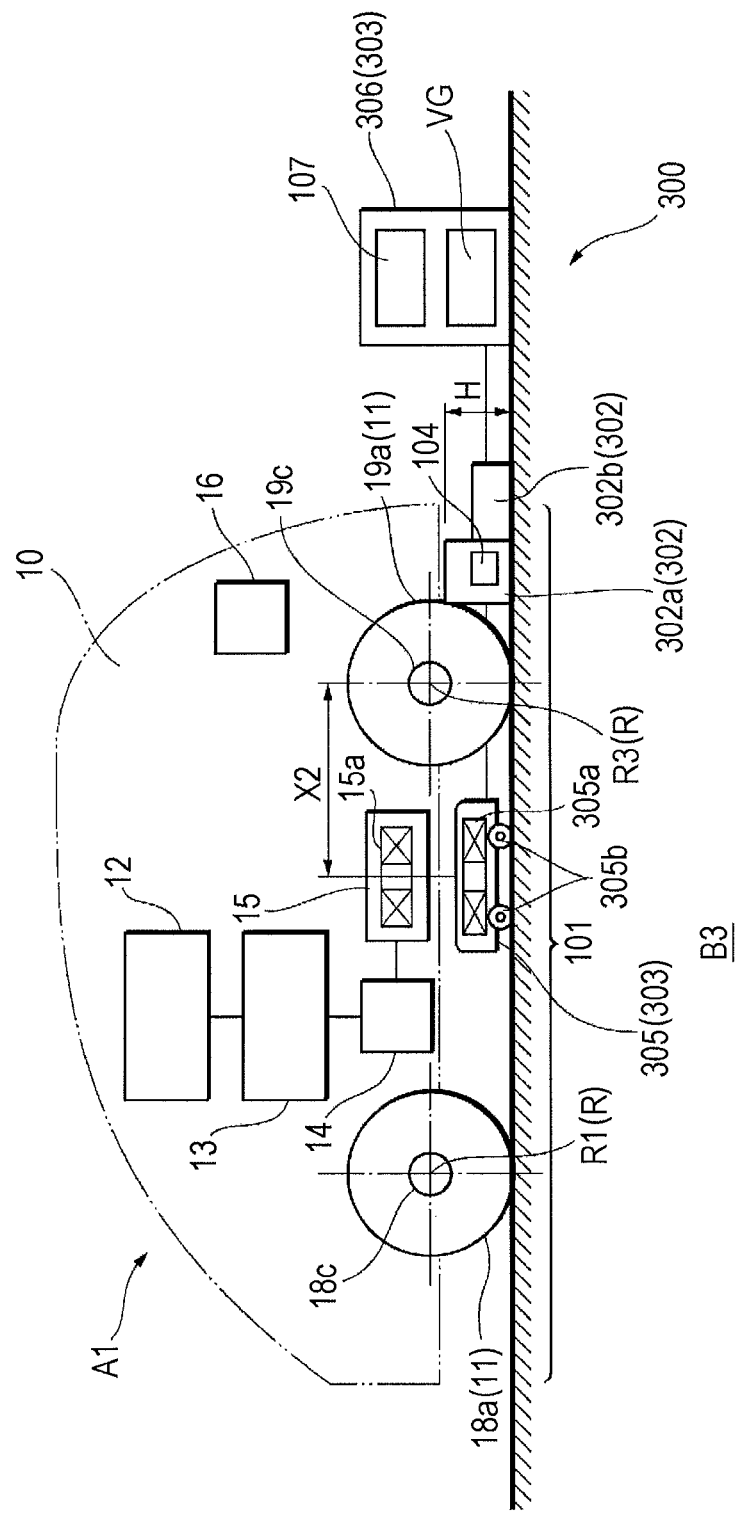
FIG. 6a is a schematic cross sectional view illustrating the structure of a system according to a third embodiment of the second invention.

Next, a structure in a third embodiment of a system according to the second invention will be described with reference to FIG. 6. FIG. 6a is a schematic cross sectional view illustrating the structure of a system B3 according to the third embodiment of the second invention. FIG. 6b is a schematic enlarged top view of the parking facility 300 in FIG. 6a. The system B3 according to the third embodiment of the second invention differs from the system B1 according to the first embodiment of the second invention in the structure of the parking facility. Differences from the first embodiment of the second invention will be mainly described below.

The system B3 includes the vehicle A1 and parking facility 300. The structure of the vehicle A1 is the same as in the embodiment of the first invention, so the description of the vehicle A1 will be omitted.

The parking facility 300 includes the parking space 101, car stops 302, and a power feeding apparatus 303, as in the parking facility 100 in the first embodiment of the second invention.

The power feeding apparatus 303 includes a power feeding unit 305, which is placed in an above-ground space in the parking facility 300, and a power feeding control unit 306, as illustrated in FIG. 6b. The power feeding unit 305 is structured by including a power feeding coil 305a and has functions of travelling within the parking facility 300. As a travelling means, four running wheels 305b are provided at the bottom of the power feeding unit 305. The power feeding unit 305 has a function of travelling in a direction parallel to the travelling direction of the vehicle A1, that is, from a side opposite to the parking space 101 toward the same side as the parking space 101. The power feeding unit 305 also has a function of travelling in a direction orthogonal to the travelling direction of the vehicle A1. However, this embodiment differs from the first embodiment of the second invention in that, as illustrated in FIG. 6b, the car stops 302 include car stop bodies 302a and 302a and moving guide parts 302b and 302b, the car stop bodies 302a and 302a in the parking facility 300 further include a reference position sensor 308, the moving guide parts 302b and 302b in the parking facility 300 further includes a standby position sensor 309, and the power feeding unit 305 in the power feeding apparatus 303 in the parking facility 300 further includes a position sensor 310.

The car stop bodies 302a and 302a are disposed so as to be spaced by a prescribed distance in a direction crossing the travelling direction of the vehicle A1. The distance by which the car stop bodies 302a and 302a are spaced is set so that the distance is smaller than a distance by which the front wheels 18a and 18b of the vehicle A1 on the right and left are spaced and by which the rear wheels 19a and 19b of the vehicle A1 on the right and left are spaced and is larger than the width of the power feeding unit 305 in a direction crossing the travelling direction of the vehicle A1. The car stop bodies 302a and 302a have a function of restricting the positions of the wheels of the vehicle A1.

Any one of the car stop bodies 302a and 302a has the reference position sensor 308. The reference position sensor 308 converts a change in a detection medium released to the position sensor 310 to an electric signal and senses, from this electric signal, the reference position of the power feeding unit 305; the power feeding unit 305 starts to travel from the reference position to a position at which the power feeding unit 305 faces the power receiving unit 15. Examples of the reference position sensor 308 include sensors that use ultrasonic sound and infrared rays, proximity sensors, and optical sensors.

The moving guide parts 302b and 302b are disposed on a side opposite to the parking space 101 so as to extend in the travelling direction of the vehicle A1. In other words, the moving guide parts 302b and 302b are disposed in a direction in which the power feeding unit 305 travels from the side opposite to the parking space 101 toward the same sides as the parking space 101. Although, in this embodiment, the moving guide parts 302b and 302b are linked to ends of the car stop bodies 302b and 302b at which the car stop bodies 302a and 302a face each other, the moving guide parts 302b and 302b may be secured on the parking facility 300 if they are brought into contact with the car stop bodies 302a and 302a.

Furthermore, any one of the moving guide parts 302b and 302b has the standby position sensor 309. The standby position sensor 309 converts a change in a detection medium released to the position sensor 310 to an electric signal and senses, from this electric signal, the standby position of the power feeding unit 305.

Since the standby position sensor 309 is disposed in any one of the moving guide parts 302b and 302b as described above, the standby position sensor 309 senses the standby position of the power feeding unit 305 on the side opposite to the parking space 101 for the vehicle A1. By contrast, since the reference position sensor 308 is disposed in any one of the car stop bodies 302a and 302a, the reference position sensor 308 senses the reference position of the power feeding unit 305 on a side relatively closer to the parking space 101 for the vehicle A1 than the sensing point of the standby point of the power feeding unit 305.

The power feeding unit 305 includes the position sensor 310. The position sensor 310 outputs, to the reference position sensor 308, a change caused due to whether the detection medium released from the reference position sensor 308 is present or absent, and also outputs, to the standby position sensor 309, a change caused due to whether the detection medium released from the standby position sensor 309 is present or absent. Examples of these sensors include sensors that use ultrasonic sound and infrared rays, proximity sensors, and optical sensors.

Although, in this embodiment, the reference position sensor 308 and standby position sensor 309 each release a detection medium and the position sensor 310 outputs a change caused due to whether the detection medium is present or absent, this is not a limitation. For example, the position sensor 310 may release a detection medium to the reference position sensor 308 and standby position sensor 309, after which the reference position sensor 308 may output, to the position sensor 310, a change caused due to whether the detection medium is present or absent and may sense the reference position of the power feeding unit 305, and the standby position sensor 309 may output, to the position sensor 310, a change caused due to whether the detection medium is present or absent and may sense the standby position of the power feeding unit 305. Alternatively, without using the position sensor 310, the reference position sensor 308 and standby position sensor 309 themselves may release a detection medium and may output a change caused due to whether the released detection medium is present or absent at the power feeding unit 305 to sense the reference position of the power feeding unit 305 and the standby position of the power feeding unit 305. In this case, in addition to the sensors described above, a sensor that uses a camera or the like can be used. That is, the standby position sensor 309 in the present invention is only necessary to be a means for sensing the standby position of the power feeding unit 305 on a side opposite to the parking space 101 for the vehicle A1, and the reference position sensor 308 in the present invention is only necessary to be a means for sensing the reference position of the power feeding unit 305 on a side relatively closer to the parking space 101 for the vehicle A1 than the sensing point of the standby point of the power feeding unit 305.

Now, a power feeding operation using the sensors in this embodiment will be described in detail. First, while the vehicle A1 is not parked in the parking space 101 and while after having entered the parking space 101, the vehicle A1 is performing a parking operation, the standby position sensor 309 senses the standby position of the power feeding unit 305 at which the detection medium released from the standby position sensor 309 is received by the position sensor 310, and the power feeding control unit 306 places the power feeding unit 305 on standby at the standby position. When the vehicle A1 has been parked in the parking space 101, the reference position sensor 308 senses the reference position of the power feeding unit 305 at which the detection medium released from the reference position sensor 308 is received by the position sensor 310, and the power feeding control unit 306 moves the power feeding unit 305 to the reference position. Then, the power feeding unit 305 is moved to the position at which the power feeding unit 305 faces the power receiving unit 15 in the vehicle A1, according to parking lot information and information that the information receiving unit 104 has received.

As described above, in the system B3 according to this embodiment, the standby position sensor 309 senses the standby position of the power feeding unit 305 on a side opposite to the parking space 101 for the vehicle A1, and the reference position sensor 308 senses the reference position of the power feeding unit 305 on a side relatively closer to the parking space 101 for the vehicle A1 than the sensing point of the standby point of the power feeding unit 305. Therefore, the power feeding unit 305 can be moved to or placed in an appropriate position according to a situation in which the vehicle A1 is not in the parking space 101 in the parking facility 300, the vehicle A1 enters the parking space 101 in the parking facility 300, the vehicle A1 is parked in the parking space 101 in the parking facility 300, or the like.

Fourth Embodiment

Next, a structure in a fourth embodiment of a system according to the second invention will be described with reference to FIG. 7. FIG. 7 is a schematic enlarged cross sectional view illustrating the structure of a parking facility 400 in a system B4 according to the fourth embodiment of the second invention. The system B4 according to the fourth embodiment differs from the system B1 according to the first embodiment of the second invention in the structure of the parking facility. Differences from the first embodiment of the second invention will be mainly described below.

The system B4 includes the vehicle A1 and parking facility 400. The structure of the vehicle A1 is the same as in the embodiment of the first invention, so the description of the vehicle A1 will be omitted.

The parking facility 400 includes the parking space 101, the car stops 102, and a power feeding apparatus 403, as in the parking facility 100 in the first embodiment of the second invention.

The power feeding apparatus 403 includes a power feeding unit 405, which is placed in an above-ground space in the parking facility 400, and a power feeding control unit 406. The power feeding unit 405 is structured by including a power feeding coil 405a and has functions of travelling within the parking facility 400. As a travelling means, four running wheels 405b are provided at the bottom of the power feeding unit 405. The power feeding unit 405 has a function of travelling in a direction parallel to the travelling direction of the vehicle A1, that is, from a side opposite to the parking space 101 toward the same side as the parking space 101. The power feeding unit 405 also has a function of travelling in a direction orthogonal to the travelling direction of the vehicle A1. However, this embodiment differs from the first embodiment of the second invention in that the power feeding unit 405 further includes a self-running motor 411.

The self-running motor 411 is linked to a running axle 405c, which passes substantially through the center of each wheel of two running wheels 405b of four running wheels 405b and rotatably supports the two running wheels 405b. The self-running motor 411 is connected to the power feeding control unit 406. The self-running motor 411 generates a driving force of the two running wheels 405b from electric power supplied from the power feeding control unit 406 to enable the power feeding unit 405 to run by itself.

As described above, in the system B4 according to this embodiment, the power feeding unit 405 has a self-running function. Therefore, the unit size of the power feeding unit 405 can be reduced. In addition, since the travelling range of the power feeding unit 405 is widened, precision in alignment between the power feeding unit 405 and the power receiving unit 15 can be further improved.

Fifth Embodiment

Figure 8A:
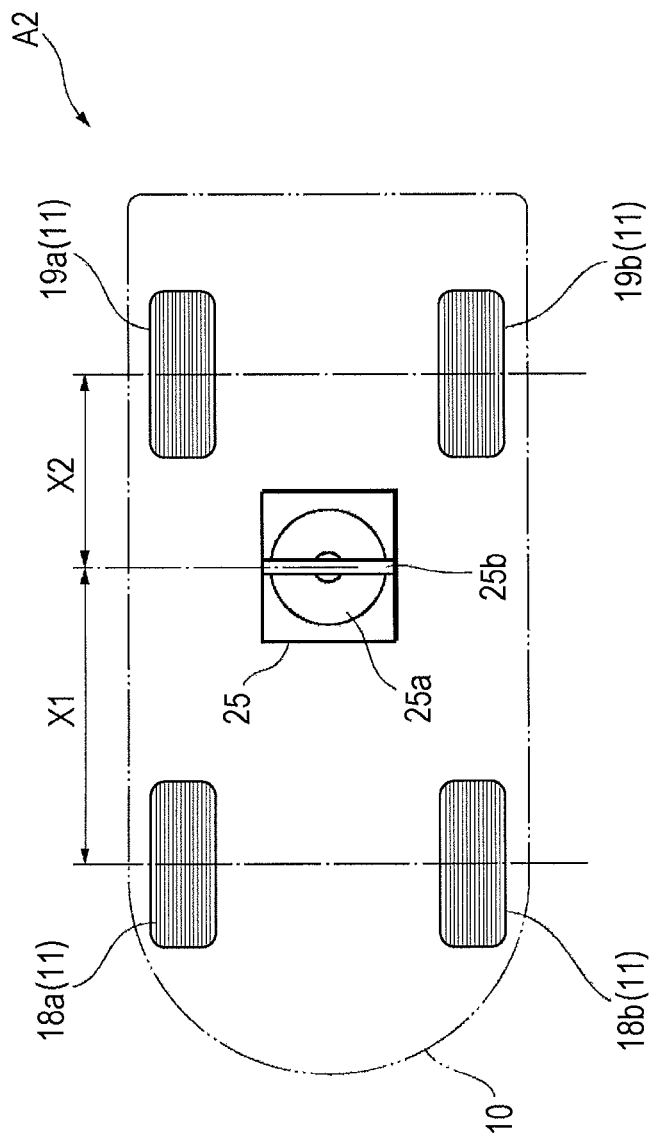
FIG. 8a is a schematic bottom view illustrating the structure of a vehicle in a system according to a fifth embodiment of the second invention.

Next, a structure in a fifth embodiment of a system according to the second invention will be described with reference to FIG. 8. FIG. 8a is a schematic bottom view illustrating the structure of a vehicle A2 in a system B5 according to the fifth embodiment of the second invention. FIG. 8b is a schematic enlarged cross sectional view of a power feeding unit 505 and a power receiving unit 25 in a vehicle A2 in the system B5 according to the fifth embodiment of the second invention. The system B5 according to the fifth embodiment of the second invention differs from the system B1 according to the first embodiment of the second invention in the structures of the vehicle and parking facility. Differences from the first embodiment of the second invention will be mainly described below.

The system B5 includes the vehicle A2 and parking facility 500, as in the system B1 in the first embodiment of the second invention.

The vehicle A2 includes the vehicle body 10, tires 11, load 12, battery 13, rectifier 14, power receiving unit 25, and vehicle information unit 16. The power receiving unit 25 is structured by including a power receiving coil 25a. The power receiving unit 25 has a function that uses the power receiving coil to receive electric power transmitted from a power feeding facility, which will be described later. However, this embodiment differs from the first embodiment of the second invention in that the power receiving unit 25 has a detection mark 25b as illustrated in FIG. 8a.

The detection mark 25b is provided on an opposing surface, of the power receiving unit 25, that faces the power feeding unit 505. There is no particular limitation to the shape of the detection mark 25b, but the detection mark 25b preferably has a band shape that passes substantially through the center of the power receiving unit 25 and extends in a direction, in the power receiving unit 25, orthogonal to the travelling direction of the vehicle A2.

The parking facility 500 includes the parking space 101, the car stops 102, and a power feeding apparatus 503. The power feeding apparatus 503 includes the power feeding unit 505, which is placed in an above-ground space in the parking facility 500, and a power feeding control unit 506. The power feeding unit 505 is structured by including a power feeding coil 505a and has functions of travelling within the parking facility 500. As a travelling means, four running wheels 505b are provided at the bottom of the power feeding unit 505. The power feeding unit 505 has a function of travelling in a direction parallel to the travelling direction of the vehicle A2, that is, from a side opposite to the parking space 101 toward the same side as the parking space 101. The power feeding unit 505 also has a function of travelling in a direction orthogonal to the travelling direction of the vehicle A2. However, this embodiment differs from the first embodiment of the second invention in that the power feeding unit 505 includes a detection sensor 512.

The detection sensor 512 is provided on an opposing surface, of the power feeding unit 505, that faces the power receiving unit 25. The detection sensor 512 performs an operation to detect the detection mark 25b. Examples of the detection sensor 512 include sensors that use ultrasonic sound and infrared rays, proximity sensors, optical sensors, and sensors that use a camera or the like.

Now, a power feeding operation using the detection sensor 512 in this embodiment will be described in detail.

When the vehicle A2 is parked in the parking space 101, the power feeding apparatus 503 first moves the power feeding unit 505 to a position at which the power feeding unit 505 faces the power receiving unit 25 in the vehicle A2, according to parking lot information and information that the information receiving unit 104 has received. At this time, the detection sensor 512 disposed on the power feeding unit 505 performs a detection operation to detect the detection mark 25b disposed on the power receiving unit 25. If the detection mark 25b is detected by the detection sensor 512, the travelling of the power feeding unit 505 is stopped and power feeding starts. If the detection mark 25b is not detected by the detection sensor 512, the power feeding unit 505 continues to travel until the detection mark 25b is detected.

As described above, in the system B5 according to this embodiment, the power receiving unit 25 has the detection mark 25b and the power feeding unit 505 includes the detection sensor 512. Therefore, fine adjustment of alignment between the power feeding unit 505 and the power receiving unit 25 is possible, so power transmission efficiency can be further increased.

Sixth Embodiment

Figure 9:
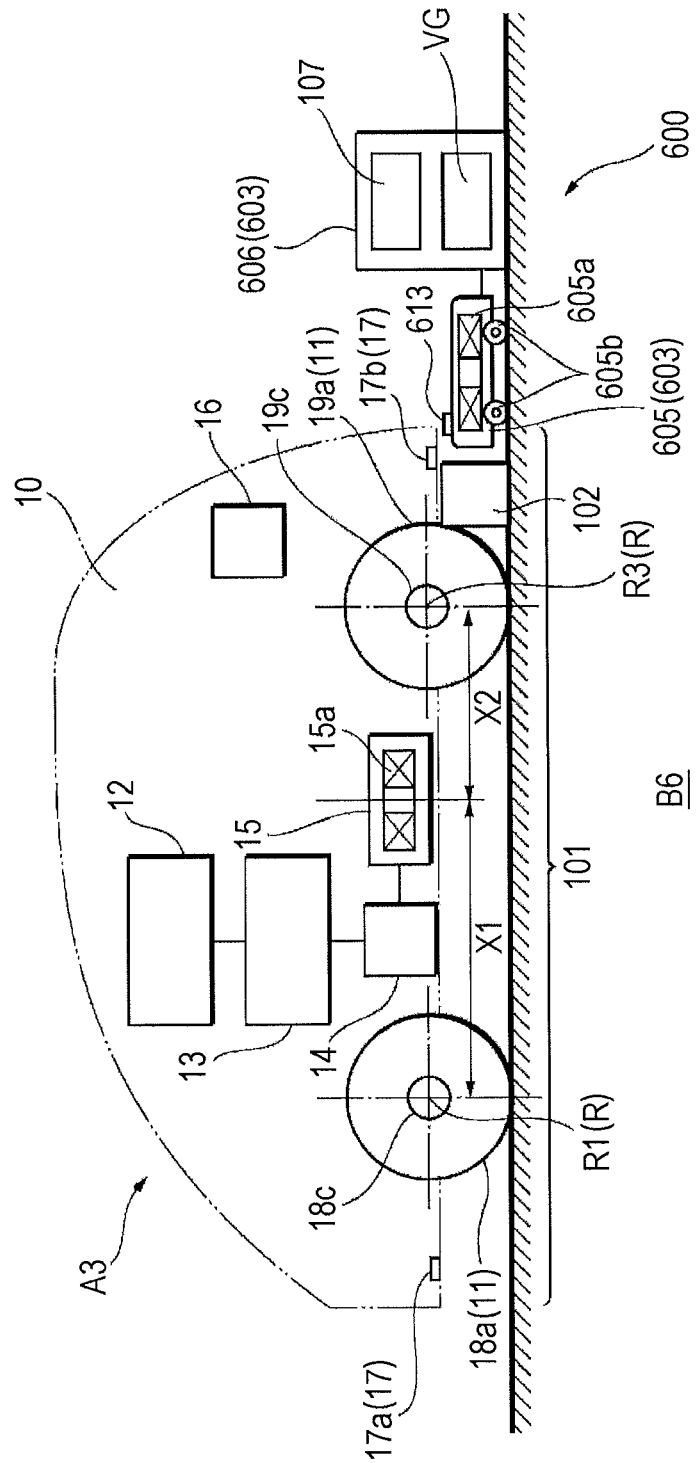
FIG. 9 is a schematic cross sectional view illustrating the structure of a system according to a sixth embodiment of the second invention.

Next, a structure in a sixth embodiment of a system according to the second invention will be described with reference to FIG. 9. FIG. 9 is a schematic cross sectional view illustrating the structure of a system B6 according to the sixth embodiment of the second invention. The system B6 according to the sixth embodiment differs from the system B1 according to the first embodiment of the second invention in the structures of the vehicle and parking facility. Differences from the first embodiment of the second invention will be mainly described below.

The system B6 includes a vehicle A3 and a parking facility 600, as in the system B1 in the first embodiment of the second invention.

The vehicle A3 includes the vehicle body 10, tires 11, load 12, battery 13, rectifier 14, power receiving unit 15, and vehicle information unit 16. However, this embodiment differs from the first embodiment of the second invention in that the vehicle body 10 has direction marks 17 as illustrated in FIG. 9.

The direction marks 17 include a forward direction mark 17a attached to the forward bottom of the vehicle body 10 and a backward direction mark 17b attached to the backward bottom of the vehicle body 10. The forward direction mark 17a has a shape that indicates the front of the vehicle A3, and the backward direction mark 17b has a shape that indicates the back of the vehicle A3. Although there is no particular limitation to the shapes of the forward direction mark 17a and backward direction mark 17b, the shape of the forward direction mark 17a and the shape of the backward direction mark 17b indicate different shapes. Although, in this embodiment, the vehicle A3 has both the forward direction mark 17a and the backward direction mark 17b, the vehicle A3 may have only the forward direction mark 17a or may have only the backward direction mark 17b.

The parking facility 600 includes the parking space 101, the car stops 102, and a power feeding apparatus 603. The power feeding apparatus 603 includes a power feeding unit 605, which is placed in an above-ground space in the parking facility 600, and a power feeding control unit 606. The power feeding unit 605 is structured by including a power feeding coil 605a and has functions of travelling within the parking facility 600. As a travelling means, four running wheels 605b are provided at the bottom of the power feeding unit 605. The power feeding unit 605 has a function of travelling in a direction parallel to the travelling direction of the vehicle A3, that is, from a side opposite to the parking space 101 toward the same side as the parking space 101. The power feeding unit 605 also has a function of travelling in a direction orthogonal to the travelling direction of the vehicle A3. However, this embodiment differs from the first embodiment of the second invention in that the power feeding unit 605 includes a direction detection sensor 613.

The direction detection sensor 613 is provided on an opposing surface, of the power feeding unit 605, that faces the power receiving unit 15. The direction detection sensor 613 creates a direction signal that indicates whether the direction mark 17 has been detected and transmits the signal to the information receiving unit 104. Examples of the direction detection sensor 613 include sensors that use ultrasonic sound and infrared rays, proximity sensors, optical sensors, and sensors that use a camera or the like.

Now, a power feeding operation using the direction detection sensor 613 in this embodiment will be described in detail. When the vehicle A3 is parked in the parking space 101, the direction detection sensor 613 performs a detection operation to detect the direction mark 17 provided on the same side as the wheels that have been brought into contact with or close to the car stops 102. At this time, if the forward direction mark 17a is detected by the direction detection sensor 613, the direction signal created by the direction detection sensor 613 is transmitted to the information receiving unit 104 and the power feeding unit 605 is moved to a position at which the power feeding unit 605 faces the power receiving unit 15 of the vehicle A3, according to parking lot information and information, which is part of information received by the information receiving unit 104, about the distance X1 from the center Z1 of a straight line that connects the axle R1 of the front wheel 18a and the axle R2 of the front wheel 18b to the center M of the power receiving unit 15, the distance being parallel to the travelling direction of the vehicle A3, and the distance Y1 orthogonal to the travelling direction of the vehicle A3. If the backward direction mark 17b is detected by the direction detection sensor 613, the direction signal created by the direction detection sensor 613 is transmitted to the information receiving unit 104 and the power feeding unit 605 is moved to a position at which the power feeding unit 605 faces the power receiving unit 15 of the vehicle A3, according to parking lot information and information, which is part of information received by the information receiving unit 104, about the distance X2 from the center Z2 of a straight line that connects the axle R3 of the rear wheel 19a and the axle R4 of the rear wheel 19b to the center M of the power receiving unit 15, the distance being parallel to the travelling direction of the vehicle A3, and the distance Y2 orthogonal to the travelling direction of the vehicle A3.

As described above, in the system B6 according to this embodiment, the vehicle A3 has the forward direction mark 17a at the forward bottom of the vehicle body 10 and also has the backward direction mark 17b at the backward bottom of the vehicle body 10, and the power feeding unit 605 has the direction detection sensor 613. Therefore, a decision can be made as to whether the parking orientation of the vehicle A3 is forward or backward, so the parking orientation of the vehicle A3 in the parking facility 600 is not limited. Since the power feeding unit 605 is moved according to the information about the parking orientation of the vehicle A3, alignment between the power feeding unit 605 and the power receiving unit 15 can be reliably performed.

Figure 10:
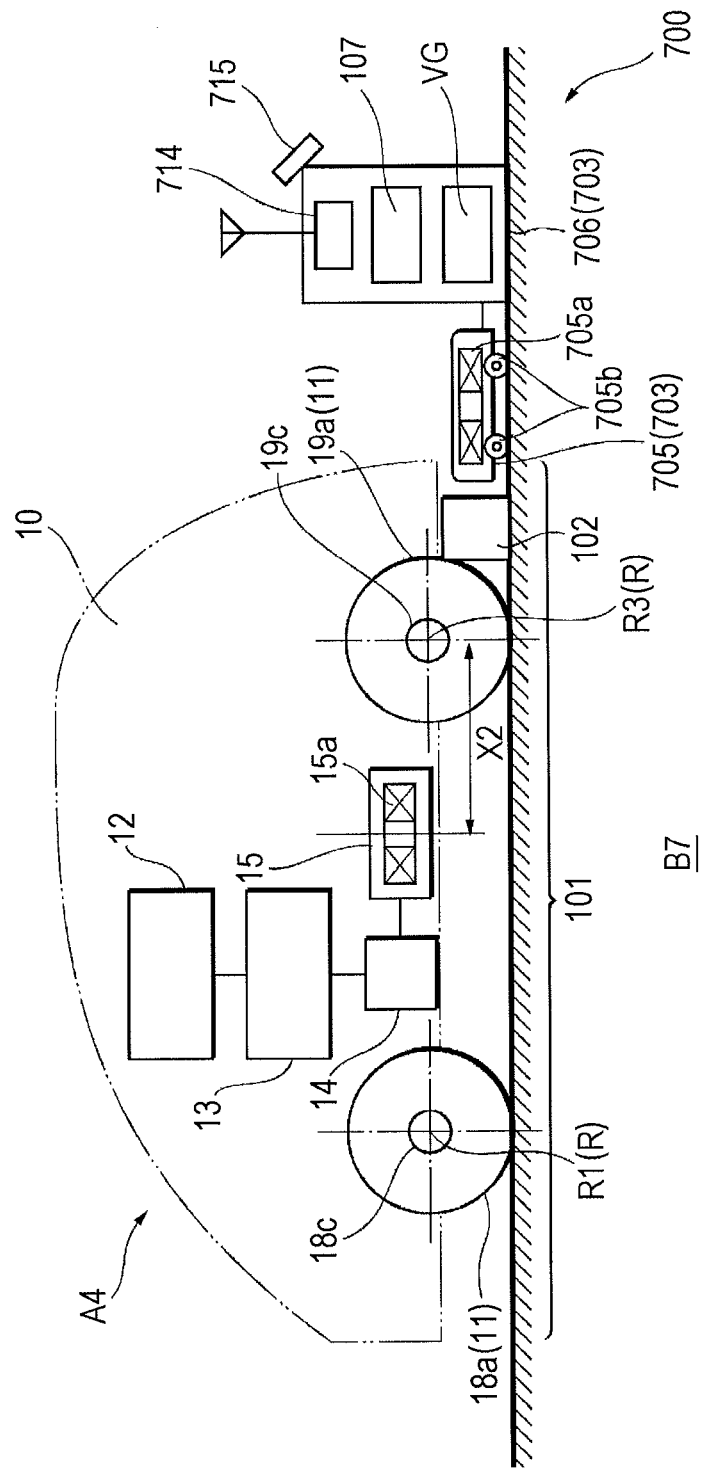
FIG. 10 is a schematic cross sectional view illustrating the structure of a system according to an embodiment of a third invention.

Next, a structure according to a third invention will be described with reference to FIG. 10. FIG. 10 is a schematic cross sectional view illustrating the structure of a system B7 according to an embodiment of the third invention. The system B7 according to the embodiment of the third invention differs from the system B1 according to the first embodiment of the third invention in the structures of the vehicle and parking facility. Differences from the first embodiment of the second invention will be mainly described below.

The system B7 includes a vehicle A4 and a parking facility 700, as in the system B1 in the first embodiment of the second invention.

The vehicle A4 includes the vehicle body 10, tires 11, load 12, battery 13, rectifier 14, and power receiving unit 15. However, this embodiment differs from the first embodiment of the second invention in that the vehicle A4 does not include the vehicle information unit 16 as illustrated in FIG. 10.

The parking facility 700 includes the parking space 101, the car stops 102, and a power feeding apparatus 703. The power feeding apparatus 703 includes a power feeding unit 705, which is placed in an above-ground space in the parking facility 700, and a power feeding control unit 706. The power feeding unit 705 is structured by including a power feeding coil 705a and has functions of travelling within the parking facility 700. As a travelling means, four running wheels 705b are provided at the bottom of the power feeding unit 705. The power feeding unit 705 has a function of travelling in a direction parallel to the travelling direction of the vehicle A3, that is, from a side opposite to the parking space 101 toward the same side as the parking space 101. The power feeding unit 705 also has a function of travelling in a direction orthogonal to the travelling direction of the vehicle A4. In this embodiment as well, a car stop 102 or the power feeding apparatus 703 has parking lot information as in the first embodiment of the second invention. However, this embodiment differs from the first embodiment of the second invention in that the power feeding control unit 706 further has a vehicle information unit 714 and a vehicle information input unit 715.

The vehicle information unit 714 has vehicle information about the vehicle A4 and information about a positional relationship between the axles R of the vehicle A4 and the power receiving unit 15 in it. The vehicle information referred to here is information about the type and model of the vehicle A4. As with the system B1 in the first embodiment, the information about the positional relationship between the axles R of the vehicle A4 and the power receiving unit 15 in it is information about the distance X1 from the center Z1 of a straight line that connects the axle R1 of the front wheel 18a and the axle R2 of the front wheel 18b to the center M of the power receiving unit 15, the distance being parallel to the travelling direction of the vehicle A4, the distance Y1 orthogonal to the travelling direction of the vehicle A4, the distance X2 from the center Z2 of a straight line that connects the axle R3 of the rear wheel 19a and the axle R4 of the rear wheel 19b to the center M of the power receiving unit 15, the distance being parallel to the travelling direction of the vehicle A4, and the distance Y2 orthogonal to the travelling direction of the vehicle A4. The vehicle information unit 714 accumulates information about X1, Y1, X2, and Y2 for each type and/or model of the vehicle A4. Although, in this embodiment, the power feeding control unit 706 includes the vehicle information unit 714, this is not a limitation. For example, the power feeding unit 705 may include the vehicle information unit 714.

Alternatively, a facility provided separately from the power feeding apparatus 703 may include the vehicle information unit 714. Although, in this embodiment, the vehicle information unit 714 accumulates the vehicle information about the vehicle A4 and the information about the positional relationship between the axles R of the vehicle A4 and the power receiving unit 15 in it, this is not a limitation. For example, the vehicle information about the vehicle A4 and the information about the positional relationship between the axles R of the vehicle A4 and the power receiving unit 15 in it may be stored in a server or the like, after which the server may be accessed through an Internet communication line to obtain information, corresponding to entered vehicle information, about the positional relationship between the axles R of the vehicle A4 and the power receiving unit 15 in it. In this case, the vehicle information about the vehicle A4 and the information about the positional relationship between the axles R of the vehicle A4 and the power receiving unit 15 in it are centrally managed, so the updating of information can be simplified.

The vehicle information input unit 715 includes a console from which vehicle information about the vehicle A4 is entered. The vehicle information referred to here is information about the type and model of the vehicle A4. Although, in this embodiment, the power feeding control unit 706 includes the vehicle information input unit 715, this is not a limitation. For example, a facility provided separately from the power feeding apparatus 703 may include the vehicle information input unit 715. Alternatively, a mobile telephone that the driver or passenger possesses may be used to enter the vehicle information without providing the vehicle information input unit 715 in the parking facility 700. There is no particular limitation to the mobile terminal if it is a device connectable to an Internet communication line. Examples of the mobile terminal include mobile telephones, multi-function mobile telephones, and tablet terminals.

Next, a power feeding operation in the system B7 in this embodiment will be described in detail. First, the vehicle A4 is parked in the parking space 101. Then, the driver or a passenger uses the console of the vehicle information input unit 715 to enter vehicle type information about the vehicle A4. In the power feeding control unit 706, comparison processing is then performed in which the vehicle type information entered into the vehicle information input unit 715 and vehicle type information accumulated in the vehicle information unit 714 are compared. If vehicle type information that matches the vehicle type information entered into the vehicle information input unit 715 is found in the vehicle type information accumulated in the vehicle information unit 714, information, corresponding to the vehicle type, about a positional relationship between the axles R and the power receiving unit 15, such as X1, Y1, X2, and Y2, is derived. Then, the power feeding unit 705 is moved to a position at which the power feeding unit 705 faces the power receiving unit 15 in the vehicle A4, according to the comparison result and parking lot information. If vehicle type information that matches the vehicle type information entered into the vehicle information input unit 715 is not found in the vehicle type information accumulated in the vehicle information unit 714, an error is displayed on the console.

As described above, in the system B7 according to this embodiment, the power feeding apparatus 703 moves the power feeding unit 705 to a position at which the power feeding unit 705 faces the power receiving unit 15 in the vehicle A4, according to a result of a comparison between information about a positional relationship between the axles R of the vehicle A4 and the power receiving unit 15 in it and information that identifies the vehicle A4 and to parking lot information. Therefore, alignment between the power feeding unit 705 and the power receiving unit 15 can be easily performed, so power transmission efficiency can be increased.

So far, preferred embodiments of the present invention have been described, but the present invention is not necessarily limited to the embodiments described above. Various changes are possible without departing from the intended scope of the present invention.

For example, as a means for transmitting electric power from a power feeding unit to a power receiving unit, any method is applicable. That is, a method is applicable in which the power feeding unit transmits electric power to the vehicle through electromagnetic induction and the vehicle receives the electric power from the power feeding unit through electromagnetic induction. Another method is also applicable in which the power feeding unit transmits electric power to the vehicle through magnetic resonance and the vehicle receives the electric power from the power feeding unit through magnetic resonance. Another method is also applicable in which the power feeding unit transmits electric power to the vehicle through electric field resonance and the vehicle receives the electric power from the power feeding unit through electric field resonance. Another method is also applicable in which the power feeding unit transmits electric power to the vehicle through electrostatic induction and the vehicle receives the electric power from the power feeding unit through electrostatic induction.

Although, in this embodiment, the vehicle information unit has information about a positional relationship between the axles of the vehicle and the power receiving unit in it, this is not a limitation. For example, the vehicle information unit may further accumulate information about the diameter of the wheels of the vehicle. In this case, by using the information about the diameter of the wheels, precision in calculation of a distance from the car stops to the power receiving unit is increased, so precision in alignment between the power feeding unit and the power receiving unit can be improved. The vehicle information unit may further accumulate information about power feeding conditions for the power receiving unit (resonance frequency, inductance, capacitance, voltage, current, and the like). Thus, the power feeding unit can supply electric power under optimum conditions.

Although, in this embodiment, the power feeding unit is placed in an above-ground space in the parking facility, this is not a limitation. For example, as illustrated in FIG. 11, an under-ground space 101a may be provided in the under-ground of a parking facility 800 so as to extend from a side opposite to the parking space 101 toward the parking space 101, and a power feeding unit 805 may be movably placed in the under-ground space 101a. In this case, since the power feeding unit 805 is placed underground, when the vehicle A1 enters the parking space 101 in the parking facility 800 or while the vehicle A1 is performing a parking operation, the power feeding unit 805 can be reliably protected. Alternatively, if a parking facility 900 has a roof 900a for protection against rain as illustrated in FIG. 12, a power feeding unit 905 may be movably attached to the roof 900a. However, the power receiving unit 15 in the vehicle A1 needs to be placed in the upper portion of the vehicle A1. In this case as well, since the power feeding unit 905 is placed underground, when the vehicle A1 enters the parking space 101 in the parking facility 900 or while the vehicle A1 is performing a parking operation, the power feeding unit 905 can be reliably protected.

Furthermore, although, in this embodiment, information about a positional relationship between the car stops and the wheels is included as parking lot information, this is not a limitation. For example, the vehicle and parking facility may have an information transmitting and receiving function and may derive a positional relationship between the car stops and the wheels through transmission and reception of information. Specifically, first, when the vehicle is parked in the parking space, a car stop detects that the tires have been brought into contact with or close to the car stops. Then, position information about the axles and information about the diameter of the wheels are transmitted from the vehicle to the car stop or power feeding apparatus. The car stop or power feeding apparatus derives a positional relationship between the car stops and the wheels by using the information received from the vehicle, car stop information such as the height and shape of the car stop, the car stop information being part of parking lot information, and approach information indicating the detected tires' contact with or closeness to the car stops. The car stop or power feeding apparatus receives information about the positional relationship between the car stops and the wheels from the vehicle, and the power feeding apparatus moves the power feeding unit to a position at which the power feeding unit faces the power receiving unit, according to the parking lot information, the information about the positional relationship between the axles and the power receiving unit, and the information about the positional relationship between the cars stops and the axles. The vehicle may have a function of detecting that the tires have been brought into contact with or close to the car stops. Alternatively, the car stop or power feeding apparatus may transmit, to the vehicle, the car stop information and approach information indicating the detected tires' contact with or closeness to the car stops, and the vehicle may derive the positional relationship between the car stops and the wheels by using the information item, the position information about the axles, and the information about the diameter of the wheel. The information transmitting and receiving function of the vehicle and parking facility is only necessary to be a function that can transmit and receive a signal by using a radio wave, light, sound, or the like.

REFERENCE SIGNS LIST 10 vehicle body
11 tire
12 load
13 battery
14 rectifier
15, 25 power receiving unit
15a, 25a power receiving coil
25b detection mark
16 vehicle information unit
17 direction mark
17a forward direction mark
17b backward direction mark
18a, 18b front wheel
18c front wheel axis
19a, 19b rear wheel
19c rear wheel axis
100, 200, 300, 400, 500, 600, 700, 800, 900 parking facility
900a roof 101 parking space
101a under-ground space
102, 202, 302 car stop
302a car stop body
302b moving guide part
103, 203, 303, 403, 503, 603, 703 power feeding apparatus
104, 204 information receiving unit
105, 205, 305, 405, 505, 605, 705, 805, 905 power feeding unit
105a, 205a, 305a, 405a, 505a, 605a, 705a power feeding coil
105b, 205b, 305b, 405b, 505b, 605b, 705b running wheel
405c running axle
106, 206, 306, 406, 506, 606, 706 power feeding control unit
107 control unit
308 reference position sensor
309 standby position sensor
310 position sensor
411 self-running motor
512 detection sensor
613 direction detection sensor
714 vehicle information unit
715 vehicle information input unit
A1 to A4 vehicle
B1 to B7 system
C1 travelling direction of vehicle
H height of car stop
M center of power receiving unit
VG power feeding source
R axle
R1, R2 axle of front wheel
R3, R4 axle of rear wheel
X1, X2, Y1, Y2 distance
Z1, Z2 center of straight line

The invention claimed is:

1. A vehicle equipped with a power receiving unit that receives electric power from a power feeding unit, wherein:
the vehicle includes a vehicle information unit that has information about a positional relationship between an axle and the power receiving unit; and
the power feeding unit is capable of being moved to a position at which the power feeding unit faces the power receiving unit, according to the information about the positional relationship between the axle and the power receiving unit.

2. A mobile body system that includes a power feeding apparatus that has the power feeding unit, a parking facility that has a car stop, and the vehicle according to claim 1, the vehicle travelling within the parking facility, wherein:
the car stop has an information receiving unit that receives information about a positional relationship between the axle and the power receiving unit;
the car stop or the power feeding apparatus has parking lot information; and
when the vehicle is parked at a predetermined position in the packing facility, the power feeding apparatus moves the power feeding unit to a position at which the power feeding unit faces the power receiving unit, according to the parking lot information and the information about the positional relationship between the axle and the power receiving unit.

3. A mobile body system that includes a power feeding apparatus that has the power feeding unit, a parking facility that has a car stop, and the vehicle according to claim 1, the vehicle travelling within the parking facility, wherein:
the power feeding apparatus has an information receiving unit that receives information about a positional relationship between the axle and the power receiving unit;
the car stop or the power feeding apparatus has parking lot information; and
when the vehicle is parked at a predetermined position in the packing facility, the power feeding apparatus moves the power feeding unit to a position at which the power feeding unit faces the power receiving unit, according to the parking lot information and the information about the positional relationship between the axle and the power receiving unit.

4. The mobile body system according to claim 2, wherein the power feeding unit travels from a side opposite to a parking space for the vehicle toward the same side as the parking space for the vehicle.

5. The mobile body system according to claim 2, wherein:
the parking facility further includes a standby position sensor and a reference position sensor;
the standby position sensor senses a standby position of the power feeding unit on a side opposite to a parking space for the vehicle; and
the reference position sensor senses a reference position of the power feeding unit on a side relatively closer to the parking space for the vehicle than a sensing point of the standby position of the power feeding unit.

6. The mobile body system according to claim 2, wherein the power feeding unit has a self-running function.

7. The mobile body system according to claim 2, wherein:
the power receiving unit further has a detection mark;
the power feeding unit has a detection sensor; and
the power feeding apparatus stops the power feeding unit at a position at which the detection mark is detected by the detection sensor.

8. The mobile body system according to claim 2, wherein:
the vehicle further has a direction mark at a front bottom of the vehicle body or a back bottom of the vehicle body;
the power feeding unit has a direction detecting sensor; and
the direction detecting sensor transmits a direction signal, which indicates whether the direction mark has been detected, to the information receiving unit.

9. A mobile body system that includes a power feeding apparatus that has a power feeding unit, a parking facility that has a car stop, and a vehicle that has a power receiving unit that receives electric power from the power feeding unit, the vehicle travelling within the parking facility, wherein:
the car stop or the power feeding apparatus has parking lot information; and
the power feeding apparatus moves the power feeding unit to a position at which the power feeding unit faces the power receiving unit, according to a result of comparison between information about a positional relationship between an axle of the vehicle and the power receiving unit and information used to identify the vehicle and to the parking lot information.

* * * * *